United States Patent
Hovsepian et al.

(10) Patent No.: US 9,690,286 B2
(45) Date of Patent: Jun. 27, 2017

(54) METHODS AND APPARATUS FOR DIGITAL MATERIAL SKINS

(71) Applicants: Sarah Hovsepian, Cambridge, MA (US); Neil Adam Gershenfeld, Somerville, MA (US); Kenneth Cheung, Boston, MA (US)

(72) Inventors: Sarah Hovsepian, Cambridge, MA (US); Neil Adam Gershenfeld, Somerville, MA (US); Kenneth Cheung, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 861 days.

(21) Appl. No.: 13/924,530

(22) Filed: Jun. 21, 2013

(65) Prior Publication Data

US 2016/0070254 A1 Mar. 10, 2016

Related U.S. Application Data

(60) Provisional application No. 61/662,358, filed on Jun. 21, 2012, provisional application No. 61/680,275, filed on Aug. 7, 2012.

(51) Int. Cl.
*G05B 19/4097* (2006.01)
*B32B 3/06* (2006.01)
*B32B 1/08* (2006.01)

(52) U.S. Cl.
CPC ......... *G05B 19/4097* (2013.01); *B32B 1/08* (2013.01); *B32B 3/06* (2013.01); *B32B 2439/00* (2013.01); *F17C 2203/0663* (2013.01); *F17C 2203/0685* (2013.01); *G05B 2219/35012* (2013.01); *G05B 2219/45067* (2013.01)

(58) Field of Classification Search
CPC ...................................................... B32B 27/08
USPC .......................................................... 428/34.1
See application file for complete search history.

(56) References Cited

U.S. PATENT DOCUMENTS

| 2,314,949 A | 3/1943 | Palmer |
| 2,380,336 A | 7/1945 | Schwebel |
| 3,005,282 A | 10/1961 | Christiansen |

(Continued)

FOREIGN PATENT DOCUMENTS

DE 202009000527 U1 3/2009

OTHER PUBLICATIONS

Lego Basic Blue Bucket Set 7615 Instructions, 2009.

(Continued)

*Primary Examiner* — Brent O—Hern
(74) *Attorney, Agent, or Firm* — Norma E. Henderson

(57) ABSTRACT

A digital material skin is made of a set of discrete units with a finite set of parts and joints. The discrete units are assembled into a layer according to a regular geometry, with each of the discrete units being reversibly connected to at least one other unit in the set. The reversibly connected set of units forms an exterior structure surface that is larger than the individual discrete units. Digital material skins may be used to construct any shape or interior volume, whether regular or amorphous. The skin surface may be enclosed or open. The skin may rely on an interior digital material structure for support or may be self-supported. The skin may be part of a larger assembly or apparatus, enclosing an interior volume or structure.

8 Claims, 32 Drawing Sheets

(56) References Cited

U.S. PATENT DOCUMENTS

| | | | |
|---|---|---|---|
| 3,157,582 A | 11/1964 | Bobule | |
| 3,836,099 A | 9/1974 | O'Neill | |
| 4,009,543 A | 3/1977 | Smrt | |
| 4,247,066 A | 1/1981 | Frost | |
| 4,593,514 A | 6/1986 | Smith | |
| 4,780,643 A | 10/1988 | Ellis | |
| 5,378,185 A | 1/1995 | Ban | |
| 5,398,472 A | 3/1995 | Eichelkraut | |
| 5,453,034 A | 9/1995 | Larws | |
| 6,336,269 B1 | 1/2002 | Eldridge | |
| 6,407,738 B1 | 6/2002 | Wakabayashi | |
| 7,007,370 B2 | 3/2006 | Gracias | |
| 7,162,324 B2 | 1/2007 | Silverbrook | |
| 7,625,261 B2 | 12/2009 | Andersen | |
| 2003/0146346 A1 | 8/2003 | Chapman, Jr. | |
| 2006/0046604 A1 | 3/2006 | Scarborough | |
| 2008/0220112 A1 | 9/2008 | Waldrop | |
| 2009/0030501 A1 | 1/2009 | Morris | |
| 2010/0007223 A1 | 1/2010 | Denne | |
| 2010/0018420 A1 | 1/2010 | Menard | |
| 2010/0197148 A1 | 8/2010 | Rudisill | |
| 2010/0260221 A1 | 10/2010 | Yu | |
| 2011/0123794 A1 | 5/2011 | Hiller | |
| 2012/0094060 A1* | 4/2012 | Gershenfeld | B32B 5/12 |
| | | | 428/99 |
| 2013/0189028 A1 | 7/2013 | Gershenfeld | |

OTHER PUBLICATIONS

Supplementary European search report, EP 11846817, international filling date Oct. 19, 2011, report dated Feb. 10, 2015.
International search report and written opinion of international searching authority, PCT/US2011/056961, international filing date Oct. 19, 2011, report dated May 21, 2012.
International search report and written opinion of international searching authority, PCT/US2013/047195, international filing date Jun. 21, 2013, report dated Nov. 1, 2013.
International search report and written opinion of international searching authority, PCT/US2013/054034, international filing date Aug. 7, 2013, report dated Apr. 15, 2014.
International search report and written opinion of international searching authority, PCT/US2013/056063, international filing date Aug. 21, 2013, report dated Apr. 28, 2014.
International search report and written opinion of international searching authority, PCT/US2014/022168, international filing date Mar. 7, 2014, report dated Nov. 28, 2014.

* cited by examiner

METHODS AND APPARATUS FOR DIGITAL MATERIAL SKINS

RELATED APPLICATIONS

This application claims the benefit of U.S. Provisional Application Ser. No. 61/662,358, filed Jun. 21, 2012, and U.S. Provisional Application Ser. No. 61/680,275, filed Aug. 7, 2012, the entire disclosures of which are herein incorporated by reference.

STATEMENT REGARDING FEDERALLY SPONSORED RESEARCH OR DEVELOPMENT

This invention was made with U.S. government support under Grant Number NNX11AN32H, awarded by the National Aeronautics and Space Administration, and under Contract No. W911NF-11-1-0096, awarded by the Army Research Office. The government has certain rights in this invention.

FIELD OF THE TECHNOLOGY

The present invention relates to apparatus construction using digital materials and, in particular, to digital material skins.

BACKGROUND

Structure design and construction requires consideration of multiple factors. The design and fabrication process will generally include considerations of: 1) design requirements, 2) likely failure modes, 3) stress analysis for failure modes identified, 4) material selection and behavior, 5) fabrication, and 6) testing, all within the context of the overall design goals. For example, in order to achieve reduction in weight, increase in strength, and reduction in cost, the engineering design, materials of construction, and methods of fabrication must all be considered. In general, modern fabrication techniques include various additive and subtractive processes, employing a range of materials, including, but not limited to, cellular materials, composite materials, and digital materials.

"Cellular materials" or "cellular solids" refers to the material structure of any living or nonliving matter, typically described as anisotropic and unidirectional or isotropic and having the same properties in all directions. Cellular materials can fill space in two-dimensions as extruded honeycomb or prismatic cells or three-dimensions as space filling polyhedra in various lattice formations. Cellular materials have been mimicked in engineered foam core structures used in construction, aerospace, and medical industries. These man made materials can be designed as highly porous scaffolds or fully dense structures which can be mechanically tuneable for a specific performance. While the science of cellular solids has enabled widespread use of lightweight materials to meet many important engineering needs, such as passive energy absorption, cellular solids are not presently in widespread use for structural applications, perhaps due to a large gap between the strength and stiffness to weight ratios of popular classical solids and the performance of known lightweight cellular materials produced from the same constituent material.

"Composite materials" describes any two materials which are combined together in a single bulk material to obtain the best properties from both materials. Many industries are shifting towards the use of more composite materials because they display the single most significant consideration for any application: low weight compared to strength. The material properties of composites are unlike any material thus far, because they combine the properties of a high modulus and high tensile strength fiber for flexibility and strength, with a low modulus stiff matrix which transfers forces from one fiber to the next, creating essentially a continuous analog bulk material. Fiber-reinforced composite materials have thus enabled construction of structures having large reductions in weight for given strength and stiffness targets, but this reduction comes at the cost of very high design and processing costs and many challenges in producing mechanical interfaces (joints).

Composites are still problematic as the material of choice hindering widespread use for many reasons. First, composites vary in fibers, resins, and weaves from one manufacturer to the next, with strength and weight dependent on layup and direction of weave. Second, composites require an energy intensive process. Highly skilled technicians are never really able to have complete control over the application of pressure and heat to allow for proper curing and even distribution of heat over the entire surface [Dorworth, C. Louis, Gardiner L. Ginger, Mellema M. Greg, "Essentials of Advanced Composite Fabrication and Repair", 2010]. Third, any flaw detected in a composite skin renders the entire material a complete waste, or makes repair difficult since creating the exact conditions to maintain bond strength is close to impossible to achieve. Fourth, not only is the composite surface designed, but the tooling and moulding for the composite is just as intensive as the final part. In the process of mitigating stress concentration, composite skins are ultimately labor intensive, time intensive, and expensive.

In contrast, digital materials promise scalable methods of producing functional things with reconfigurable sets of discrete and compatible parts. Digital materials are comprised of a small number of types of discrete physical building blocks that may be assembled to form constructions that have a level of versatility and scalability that is analogous to that of digital computation and communication systems. Digital materials have specifically been defined in prior work by Popescu as having three main properties at the highest level of description: a finite set of components or discrete parts, a finite set of discretized joints of all components in a digital material, and complete control of assembly and placement of discrete interlocking components [Popescu, G., Gershenfeld, N. and Marhale, T., "Digital Materials For Digital Printing", International Conference on Digital Fabrication Technologies, Denver, Colo., September 2006].

A digital material desktop printer, now called the MTM Snap, was the first application constructed entirely out of discrete, snap-fit, reversible digital materials The entire structure for the MTM Snap is made up of a finite set of discrete parts, with built-in flexural connections and slots that are all milled as one CAD file on any CNC shopbot machine. The parts for the machine are made of high density polyethylene, which as a material demonstrates great potential to create robust and stiff flexural connections, although it can be made out of many other suitable materials. The entire machine can be fabricated within a day, with additional motors and tool heads installed depending on the fabrication method desired. These digital material printers can print or mill their own parts, in order to replicate and build more machines like themselves. Current work at MIT's Center for Bits and Atoms is taking the digital material printer to the next level, by incorporating a pick and place mechanism, called a digital material assembler, which is a machine that picks and places each newly fabricated piece to create the final form. The possible properties of digital materials are myriad, and they can be designed out of any material using existing fabrication technologies and tools in order to build cellular structures for any application. Digital materials, as compared to analog materials, are completely reversible, eliminating waste by allowing individual parts to be reused and recycled at any point in the product lifecycle, no matter how large the assembly.

Several additive methods that use discrete components to create an analog material as a final product are known in the art. Selective laser sintering (SLS) uses high power lasers to fuse powders such as glass, metal or thermoplastics, creating forms that are irreversible. The powders are not analog, but are initially formless particles that are discrete and separate. Upon fusing a particle to another, a new analog material is created that is continuous and attached to adjacent particles to form the larger object. Another such additive method is fused deposition modeling (FDM). FDM takes a coil of thermoplastic or metal wire and deposits material from an extruder by heating and melting the material. Stereolithography (SLA) is similar to SLS, but instead of using powder, uses a vat of liquid with a high power laser to create the part in cured layers [Bourell, D. L., Leu, M. C. & Rosen, D. W. (Eds.) Roadmap for Additive Manufacturing: Identifying the Future of Freeform Processing, Austin, Tex., The University of Texas at Austin Laboratory for Free-form Fabrication, 2009]. Electron beam melting (EBM) is another additive process prevalent in the aerospace industry, and uses an electron beam to melt metals such as titanium in powder form. Similar to previous processes, each part is built one layer at a time, solidified and a subsequent layer is built. Current additive manufacturing technologies may utilize the same materials used in manufacturing processes, but the final products rarely behave per material specification, always depend on the machine for surface resolution, and any error in the part generates wasted material.

Conversely, subtractive manufacturing processes take solid blocks or sheets of material and machine out material by drilling or milling from the existing material to create the final part. The initial material is analog in nature, but often these discrete parts are combined within larger assemblies using irreversible joining and bonding methods which again, render the assemblies irreversible, with surface resolution depending on the machine tools used, and any error in the part means waste of the entire assembly of materials. For any given additive or subtractive process, representation of the initial model and translation from initial design to final product requires greater integration than the tools currently offer. Digital fabrication is currently only great at rapid prototyping and not for creating reliable, robust functional structural components yet.

Many things in nature exhibit a sandwich structure, comprising a skin with an exterior and interior contents that support the skin. Depending on the mass of the matter or structure, the moment of inertia is an important property which can be derived from the cross section of any structure, dictating whether the material is strong and able to resist bending and buckling forces. The moment of inertia increases as the cross section of any given shape such as a tube also increases, provided that the radius divided by the tube thickness ratio also increases. There are many similarities between a digital material and a cellular material. By preserving these concepts and translating them to other materials such as metals, plastics or composites, structural skins can be created with the best resistance to bending and buckling, with specific tuneable properties.

Structural skins, such as those used in pressure vessels, are envisioned as a primary application for digital materials. Pressure vessels are leak proof containers for containing matter, whether present as solid, liquid, or gas. In particular, spacecraft missions have traditionally sacrificed fully functional hardware and entire vehicles to achieve mission objectives. Propellant tanks, which are pressure vessels, are typically jettisoned at different stages in a spacecraft mission and left to burn in the atmosphere after one use, creating a substantial amount of waste and redundancy which leads to high operational costs. Spaceflight programs cannot continue to rely on current methods of discarding hardware, since the cost to transport materials from Earth is extremely high. Significant improvements need to be made in recovery and reuse of valuable hardware, to be able to lower costs per mission and increase the number of missions. Strategies therefore need to focus on avoiding complete loss of hardware.

Pressure vessels can have any combination of geometries based on cylinders, ellipsoids or spheres. Many materials, tools and processes can be chosen, each displaying significant advantages for different metrics such as cost, mass, strength, and vessel life. In a pressure vessel, an axis-symmetrical shell cross section with some internal pressure is subject to radial forces which distribute along the circumference of any cross-section considered. Internal forces translate to hoop stress, which act tangentially in plane with the vessel skin. Spherical pressure vessels are stronger than cylindrical pressure vessels, because stress is uniformly distributed at every point, but are more difficult and expensive to manufacture. The mass of a vessel is proportional to the pressure and volume it contains. To determine stresses resulting from loads, the relationship between stress and strain from an applied static or dynamic load needs to be quantified for a given material, pressure, and vessel thickness. A spherical pressure vessel considered for any given circumference along the cross-section contains two types of stresses: radial and hoop [Harvey R. John, "Theory and Design of Pressure Vessels", Springer, Sep. 19, 1991]. Hoop stresses occur at every point, in a direction tangential to the plane the point lies on. The vessel skin will try to expand or contract, depending on what direction the radial forces are pointing. To understand the force along a given cross-sectional cut of the spherical vessel with a small thickness (in comparison to other dimensions of the vessel), the vessel must achieve equilibrium of forces for the exterior and interior pressure values.

There are several traditional fabrication methods for continuous pressure vessel skins. Most pressure vessels are made of two or more parts that have been previously fabricated as segments of a cylinder or hemisphere, which are then joined to form the base vessel with additional attachment and openings. Traditionally, three types of processes are used for vessel fabrication: welding, forging, and brazing.

The general welding technique for welding two parallel parts with no overlap is called a butt-weld, used in in conjunction with any of the following pressure welding processes: explosive, flash, thermit, induction, continuous drive friction, inertia, resistance, and gas pressure. No matter what the weld process, any one of those mentioned creates a non-precise fabrication process increasing stress factors or potential failure modes in the vessel. There are several potential failure modes during the welding process. The first area where failure can be introduced is with the structure of the metal being welded when compared to the parent metal, which may or may not have a similar structure. The second is that failure can be introduced is during the welding process creating local deformities in the form of porosity, lack of fusion, slag inclusions and shrinkage cracks. The third is due to local stress concentration as a result of misalignment of the two vessel halves, which have been prefabricated as separate segments. The fourth area is with the weld geometry and surface finish, whereby deformities arise from less than perfect welding techniques. The fourth area has to do with repair of welded vessel joints, which often cost more than just using an existing method to remove and re-weld the two halves. Repairing welds is also risky, because one never knows with all the tests whether the weld has produced in some cases a less than desirable result compared to the original surface of the vessel skin.

All methods from casting of metals, multilayer construction, wire wrapped construction or filament wound vessels, the part production and the joints and their associated processes create flaws which affect the entire assembly or piece. Through these local discontinuities, entire structures eventually undergo global failure. The same failure modes for aircraft skins generally apply to pressure vessel skins and for other skin applications. Structural composites for pressure vessel applications will soon replace steel tanks, since composite vessels are demonstrating a 60% weight reduction, less corrosion, require low maintenance, and normally do not need coating for UV protection.

In a filament wound vessel, a permanent or removable mandrel in the shape and size of the final pressure vessel is wound continuously with a filament. The carbon fiber matrix is applied with a wrapping system oriented in the principal direction of stress incurred in the system. Also, if the longitudinal stress is three times the hoop stress, then the mandrel is filament wound three times the thickness of the hoop direction in the longitudinal direction, to maintain the same stress throughout the skin. The advantages of filament wound vessels include high strength to low weight material properties, high corrosion resistance due to material properties of the resin, and lower notch sensitivity since broken filaments do not affect neighboring filaments.

Multi-layer construction of pressure vessels is another common fabrication method, where the tank system contains an inner shell between ¼"-½" thick, wrapped and welded in order to incur the membrane stresses. It is created as a concentric layered skin system, with attachments and holes drilled in different layers to be able to monitor leakage. The advantages of multi-layer construction include lower costs since each layer can be a different material, the inner compatible with the matter contained and the outer can be a cheaper material used to hold the tank walls in place. Disadvantages include local stress concentration since layers are not attached, and thermal gradients created by heating and cooling of different layers at different rates.

SUMMARY

A digital material skin is made of discrete units with a finite set of parts and joints used to construct functional structural skins for airtight, waterproof, high or low energy and pressure applications. Digital material skins are used to construct any shape or interior volume that is regular or amorphous. The surface is enclosed or the surface is open. A digital material skin is an exterior structure that relies on an interior digital material structure for support, or a digital material skin is self-supported with few or no interior structural support. Parts and links are arranged and configured in a regular pattern to create a surface larger than the units. The skin is part of a larger assembly or part of a single unitary bulk material structure of any size or shape. The skin has a thickness that is smaller or larger than any dimension. The skin is made of one or more layers of one material or multi-material units. The joints are reversible, allowing transfer of forces from one unit to adjacent units.

In one aspect of the invention, a new class of materials, called digital material skins, is described that will revolutionize the fabrication and assembly of everyday functional objects to spacecraft structural applications, by embedding the intelligence not in the fabrication tools but in the materials themselves, to create reusable and recyclable materials. A workflow for digital material skins is demonstrated, based on existing fabrication tools to rethink the entire lifecycle of functional skins from design to fabrication to disassembly. Precision therefore lies not in the human assembler but in the material, component geometry, and linking mechanism, which dictate how and where each material interlocks within the larger material system.

This work seeks to demonstrate the applicability of a digital material approach in designing new cellular materials and methods for assembly of structures with static reconfigurability. It is envisioned that a primary application of this invention is reversible reusable pressure vessels, such as those proposed for spaceflight-related applications. The difference between the proposed digital material skin lifecycle for a spacecraft pressure vessel skins vs. past and current models is largely related to material selection. Instead of selecting a material, engineers will design a new material based on geometry, scale, attachment, properties, and arrangement of discrete multimaterial units within a larger structure. Future building, aircraft, and spacecraft skins will not be fabricated as large unitized structures, but as thousands of small standardized parts, and assembled in a factory as easily and quickly as Lego™ pieces are snap-fit together, contributing to lowered fabrication and assembly costs, new multi-material combinations with specific properties for high strength to weight ratios, greater payload mass, improved performance, lower risks, fuel savings and recyclability and reuse of materials at the end of the product lifecycle Digital Cellular Solids exhibit improvements, in relative stiffness and strength compared to relative density, over current practices for producing lightweight materials. This is accomplished by assembling lattice geometries that perform better than any that are presently made with traditional methods. When implemented with fiber composites, the result is not only stiffer and stronger than any previously known ultra-light material, but it presents a new scalable and flexible workflow for applying fiber composites to engineering problems. Like cellular skins and solids in nature, the future of digital fabrication of functional objects will be revolutionized with digital material skins and digital material solids.

BRIEF DESCRIPTION OF THE DRAWINGS

Other aspects, advantages and novel features of the invention will become more apparent from the following detailed description of the invention when considered in conjunction with the accompanying drawings wherein.

DETAILED DESCRIPTION

Figure 1:
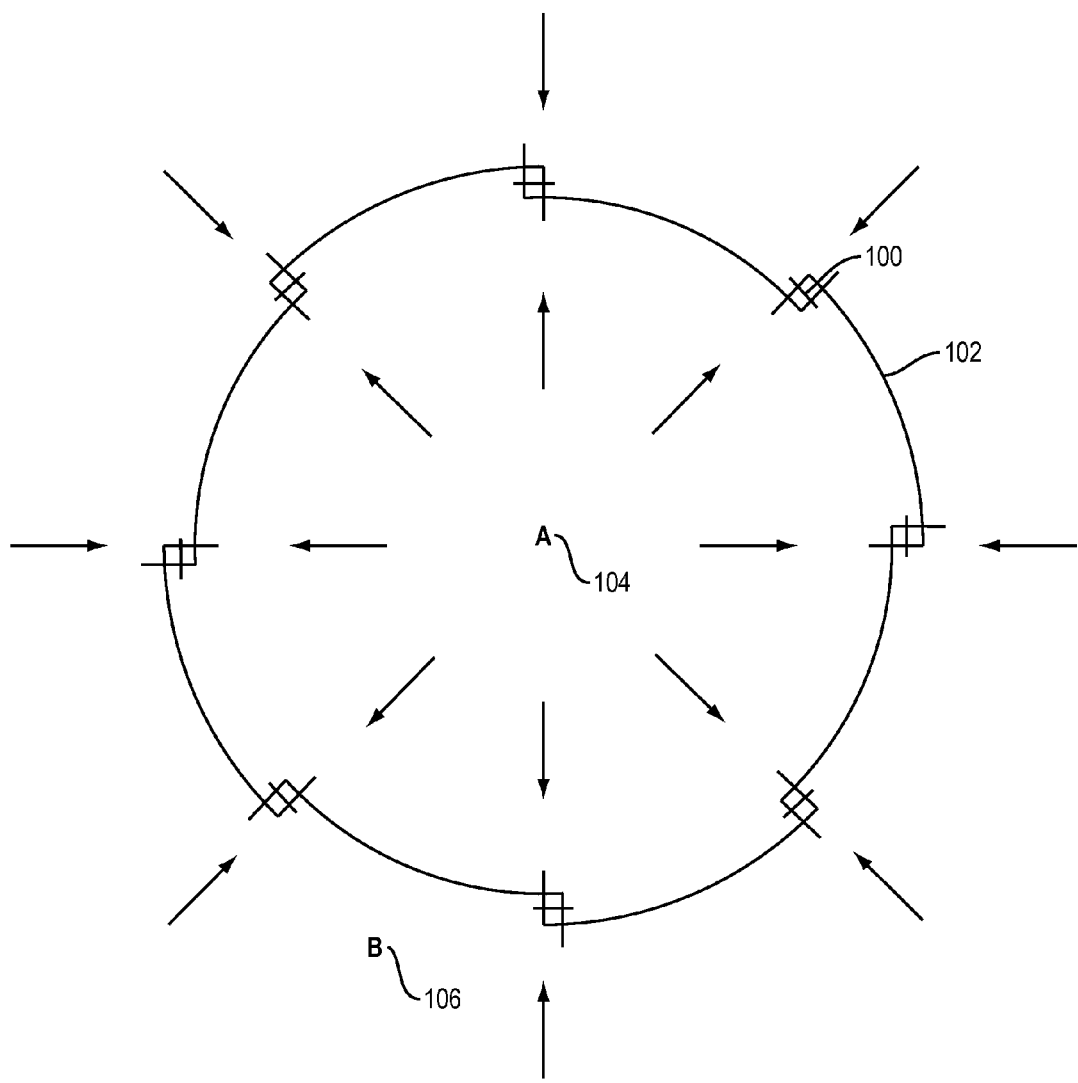
FIG. 1 is an exemplary embodiment of a self-supporting digital material skin made up of a standard repetitive unit held together by a discrete standard repetitive joint, according to one aspect of the present invention.

A digital material skin is a layer that is made of discrete units, with a finite set of parts and joints used to construct a functional structural skin for airtight, waterproof, high or low pressure applications. Parts and links are arranged and configured in a regular pattern to create a surface larger than the units. The surface may be enclosed or open, depending on the application. Digital material skins according to the invention may be used to construct any shape or interior volume, whether regular or amorphous. A digital material skin may be an exterior structure which relies on an interior digital material structure for support, or a digital material skin may be self-supported, with few or no interior supports. The skin may be part of a larger assembly or may be part of a single unitary structure of any size or shape. The skin may have a thickness that is smaller, or larger, than any dimension. The skin may be made of one or more layers of one material or may be made of multi-material units. The joints are reversible, allowing transfer of forces from one unit to adjacent units.

As used herein, the following terms expressly include, but are not to be limited to:

"Analog" means information or physical matter that is represented as a continuous quantity.

"Analog material" means any continuous material or any material used to create a bulk material with special properties, such as, but not limited to, thermoplastics deposited continuously or a solid block of wax. All additive manufacturing processes use materials that are analog in nature to create 2D, 2.5D, and 3D models.

"Digital" means information or physical matter that is represented as discrete quantities or values, depending on the user-defined representation of the system. The term 'digital' in digital fabrication is not to be confused with this definition.

"Digital composite" means a material comprising many discrete units, which units comprise composite material reinforced with anisotropic fibers.

"Digital fabrication" means the use of tools and manufacturing processes that permits taking parts as initial CAD representations, and to then create prototypes that are closer to the final product by using analog materials.

"Digital material" means a material made out of components wherein the set of all the components used in a digital material is finite (i.e. discrete parts), the set of the all joints the components of a digital material can form is finite (i.e. discrete joints), and the assembly process has complete control over the placement of each component (i.e. explicit placement).

A primary proposition behind the concept of digital material fabrication is that properly engineered kits-of-parts (with fewer primitives than the average reconfigurable toy construction set), in conjunction with automated assembly and disassembly (hence static reconfigurability), can produce functionally useful parts that have life cycle efficiencies exceeding that of conventional engineered fabrication methods. Structures built with this kit may be well tuned to support a wide range of static and dynamic loads. Further, the system has the ability to gradually adapt to new load patterns, with mobile units that travel over the structure and delete portions of its own structure, as well as other units that are capable of adding new material. Even in its densest form, these structures maintain an integral set of communication channels that allow for the diffusion of information, such as signaling the need to adapt the structure.

Digital material skins according to the invention employ reversible joining methods to create the skins out of discrete parts. Joining methods that can be reversible for disassembly and assembly, reuse, and recyclability include, but are not limited to, adhesives, fasteners, press-fit joints, and snap-fit joints.

Although adhesives are generally non-reversible, they demonstrate great potential in composite applications which require thin and flexible joints to adhere two or more materials together such as mylar film or composite laminates. Any adhesive is made up of a highly viscous fluid which fills the pores of the surface to which it bonds. The best applications use adhesives with high surface area to low volume bonding, which creates stronger interatomic bonding. For example, in the case of a sheet of paper that adheres to another sheet of paper, it is more difficult to peel the sheet with the adhesive away because the forces are distributed over a larger area, creating less stress concentration and a stronger joint. In an idealized adhesive, the adhesive that wets two material forms a concave edge at its interface with the atmosphere. If this is the case, then the radius of the circle R with a thickness 2r can be used to calculate the difference in pressure between the air and the pressure in the liquid. As long as r is less than R, then the difference in pressure is negative, which means the pressure in the air is greater allowing greater compression and adhesion in the joint, such that:

$$P_L - P_A = \gamma_{LV}\left(\frac{1}{R} - \frac{1}{r}\right)$$

Fasteners are fully reversible in most applications where two or more materials are being joined. Fasteners can be used to join any kind of material of any shape. Fasteners are also inexpensive because parts can be ordered off the shelf since there are standard established sizes for any manufacturing application. While fasteners are great for these reasons, they do not necessarily deliver in terms of strength compared to other bonding methods such as welding. Fasteners may also require extra parts and may be difficult to automate for high volume production. There are several factors to considers when using fasteners including the following: high stress concentration because of over-tightening a screw or rivet, threads can get ruined as the screw is inserted, and burring on the screw head or on the nut can also create stress and failure in the system.

Press-fit joints commonly use interference to allow parts to maintain a certain level of stress, without loosening the connection or creating an excess of stress in the joint. They are held together by friction, where pressure from both materials act on the contact surfaces. Snap-Fit joints can be made out of any material, but usually work with plastics. When designing a joint, two parts are engaged and under stress until an undercut relieves the interference. During interference, the joints should not go above their linear portion of the stress strain curve. Once both parts have joined, the load should continue to keep the parts engaged, without any additional stress. The very end of each joint features an extrusion which extends from both sides to be able to catch the mating material to snap in place.

A digital skin according to one aspect of the present invention may be either self-supporting, or supported by another structure. FIG. 1 depicts a self-supporting digital material skin made up of a standard repetitive unit 102 which tiles over any volume, held together by a discrete standard repetitive joint 100 that may or may not be integrated within 102. The interior 104 of the volume enclosed by a digital material skin is referenced A and the exterior 106 is referenced B. The system can vary in the amount of pressure for the interior 104 in relation to the exterior 106, creating a high-high pressure, high-low pressure, low-high pressure or low-low pressure scenario.

Figure 2:
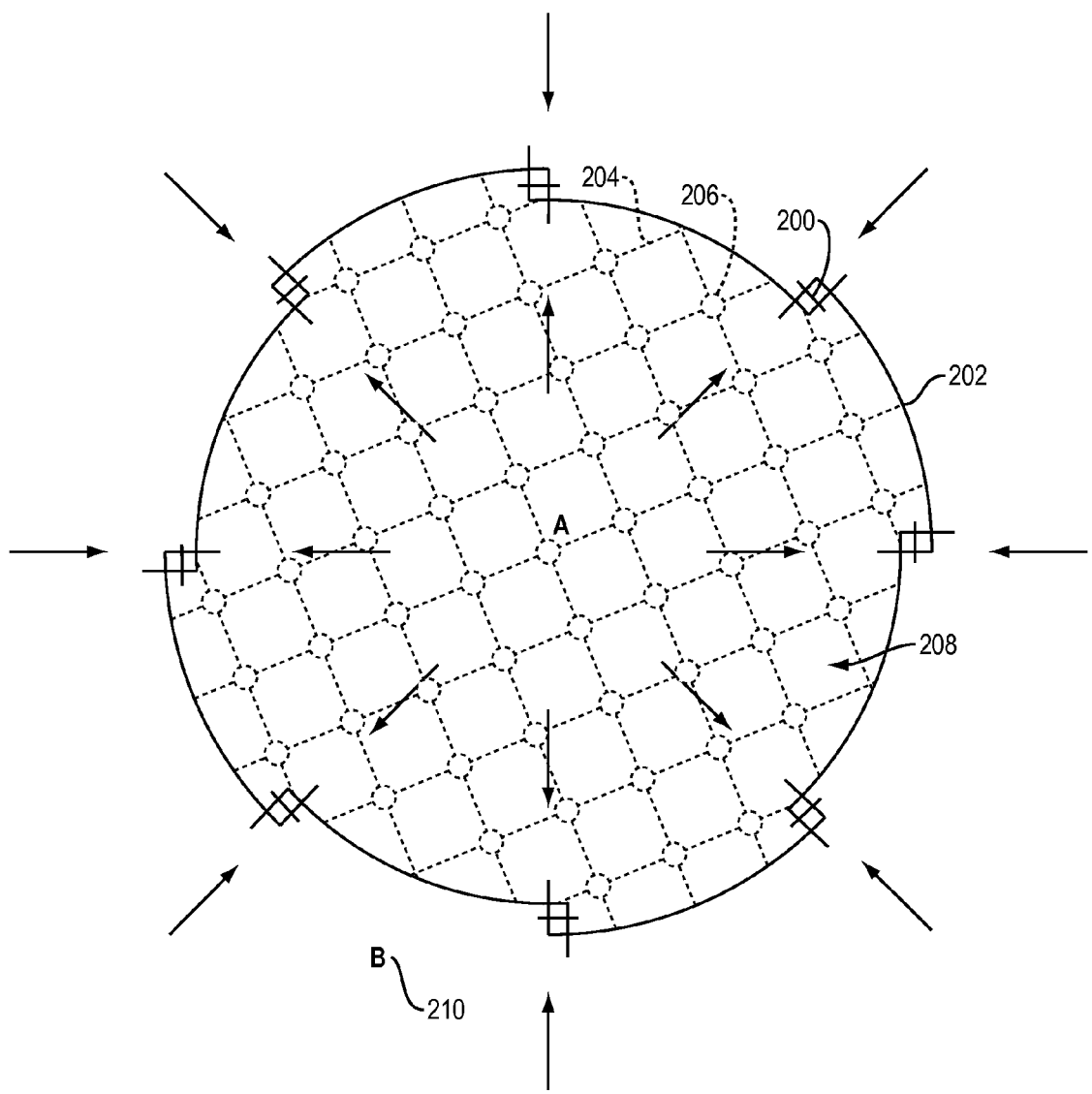
FIG. 2 is an exemplary embodiment of a digital material skin made up of discrete standard repetitive skin components with interlocking components and supported by an interior digital material volume, according to one aspect of the present invention.

FIG. 2 depicts a digital material skin made up of discrete standard repetitive skin components 202 with interlocking components 200, illustrating skins that are supported by an interior digital material volume made up of a digital material unit 204 and a digital material joint 206. The joints for digital material skins may or may not be integrated within the units themselves, depending on the joining technique. The interior 208 of the volume enclosed by a digital material skin is referenced A and the exterior 210 is referenced B. The system can vary in the amount of pressure for the interior volume 208 in relation to the exterior 210, creating a high-high pressure, high-low pressure, low-high pressure or low-low pressure scenario. Such a system forms what is typically called foam core sandwiched structures, where the interior volume 208 reacts in compression and provides stiffness while the exterior digital material skin works in tension as a membrane that seals the system.

Figure 3:
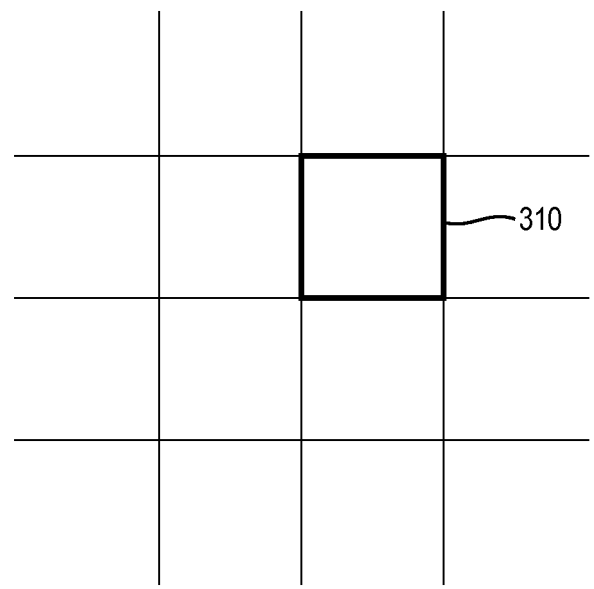
FIG. 3 depicts an exemplary square grid used to derive the design of a digital material skin unit.

To design a digital material skin, one may begin by determining what global form or geometry is desired, although this is not always the case. Once the form is determined, it may then subdivided into similar repetitive panels or units in space. Also, if no global geometry is defined, then the digital material skin may initially start from a square, triangle or hexagonal grid. For example, as seen in FIG. 3, a square 310 grid can be used to derive the design of the digital material skin unit, or as seen in FIG. 4, a triangular 410 or hexagonal 420 grid can be used.

Figure 4:
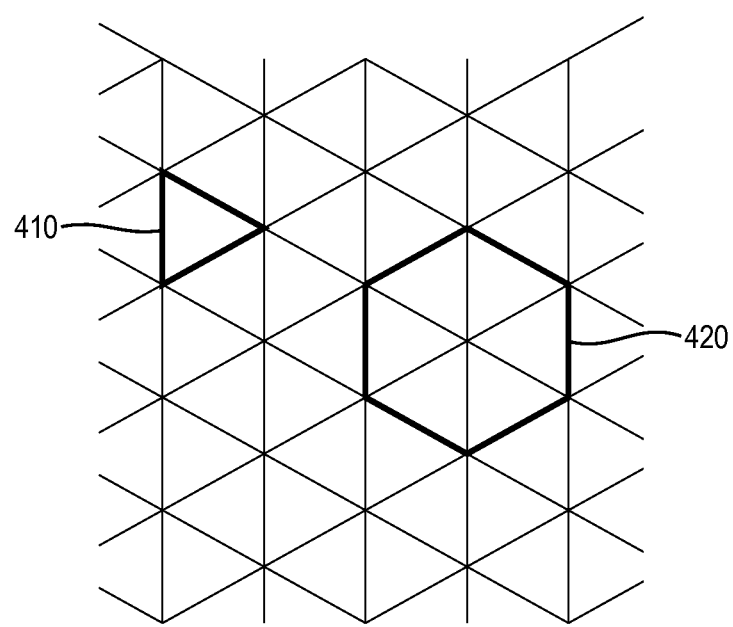
FIG. 4 depicts exemplary triangular and hexagonal grids used to derive the design of a digital material skin unit.
Figure 5:
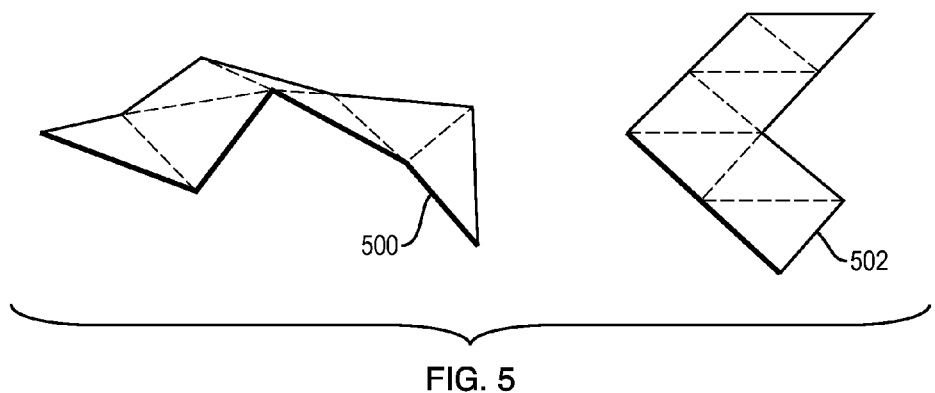
FIG. 5 depicts an exemplary digital material skin geometry that can work as a bent unit at specific edges derived from the grid of FIG. 4 or may alternatively function as a flat piece.
Figure 6:
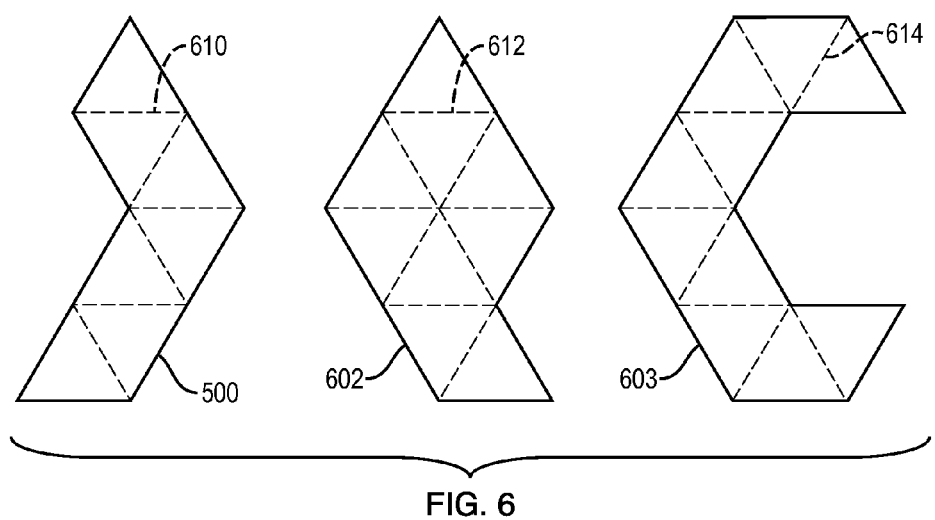
FIG. 6 depicts three different exemplary digital material skin geometries derived from the grid of FIG. 4.

In a preferred embodiment, a triangular 410 grid, such as shown in FIG. 4, is used for a digital material skin to be tiled in space to enclose any volume or 2D surface. FIG. 5 depicts an embodiment of a digital material skin geometry that can work both as a bent unit 500 at specific edges derived from the grid in FIG. 4 or as a flat piece 502. A digital material skin can thus have any perimeter geometry defined by the user within the bounds of an underlying grid. FIG. 6 depicts three different exemplary digital material skin geometries 500, 602 and 603. Unit 500 is the same piece depicted in FIG. 5, while 602 and 603 depict a different geometry that is still derived from the grid system of FIG. 4. As part of the first embodiment, a digital material skin surface made up of these three different geometries in cross-section illustrates the potential that a digital material skin system can be made up of more than one type of similar and repetitive units. The dotted lines 610, 612, 614 shown in the units of FIG. 5 and FIG. 6 illustrate the underlying grid and where potential folding can occur.

Self-Supporting Skin—A Stacking Scheme

Figure 7:
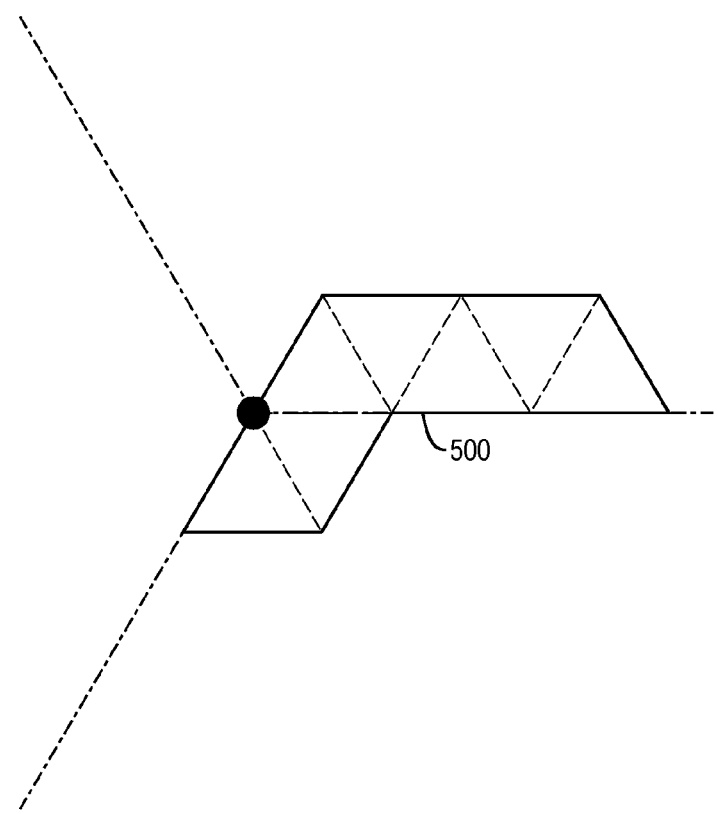
FIG. 7 depicts translation of skin unit 500 from FIGS. 5 and 6 by simple rotation.
Figure 8:
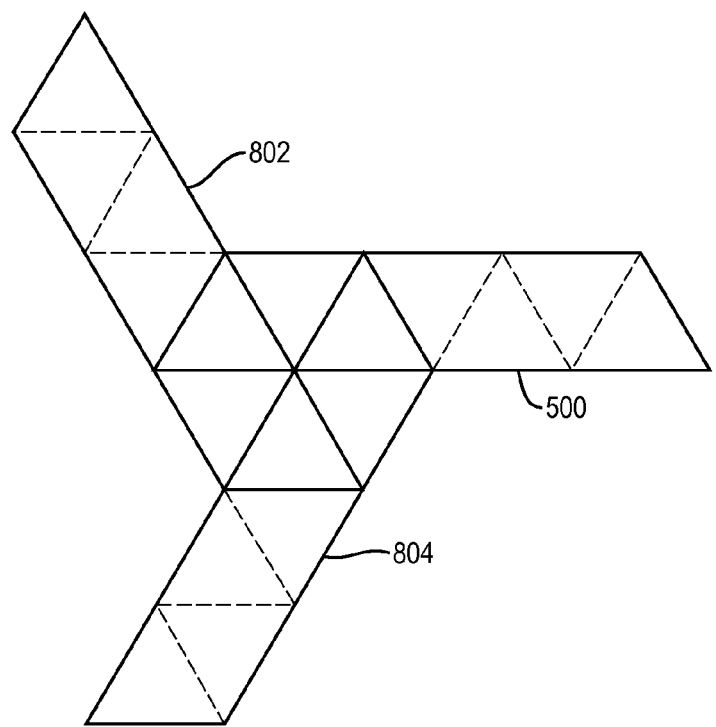
FIG. 8 depicts three skin units 500 from FIGS. 5 and 6, translated and overlapped.

In a preferred embodiment of a digital material skin, a stacking method may utilize any number of different digital material skin types and any number of digital material skin units to create overlap in plan and cross-section. FIG. 7 illustrates how the first and topmost piece 500 in a preferred embodiment digital material skin system is translated by a simple rotation and copied for a total of three skin units 500, 802, 804, as shown in FIG. 8 in a top view. Any number of skin units can be used. Dotted lines are shown to illustrate the underlying grid system and potential areas for folding and interlocking.

Figure 9:
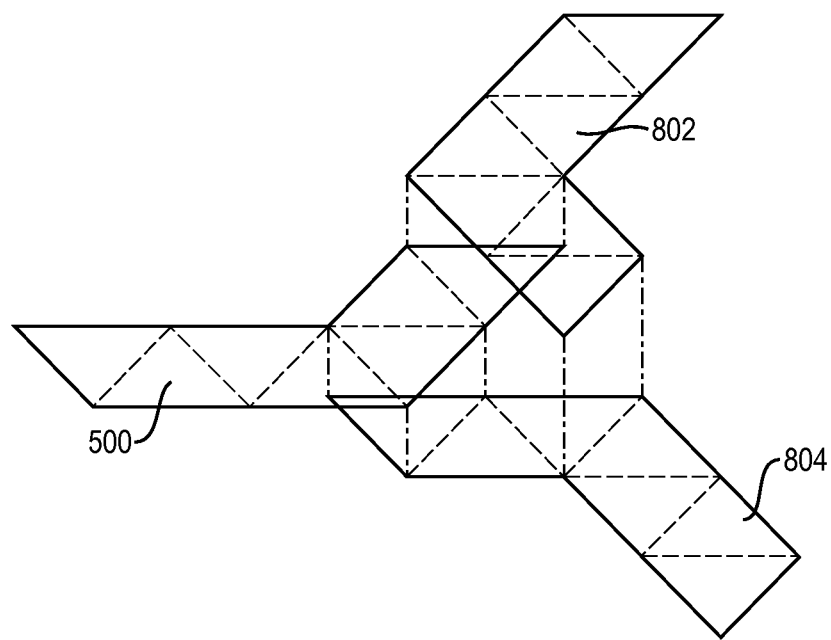
FIG. 9 is a perspective view of the assembly of the construct of FIG. 8.
Figure 10:
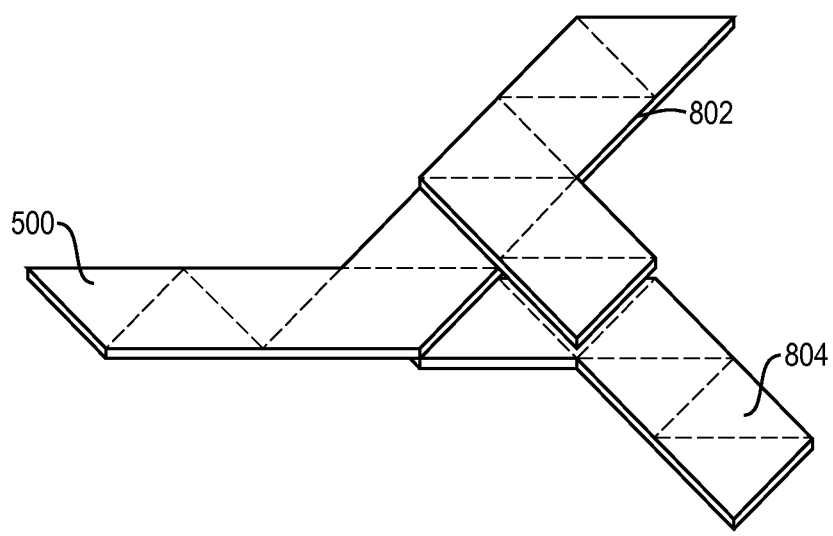
FIG. 10 is a perspective view of the stacked three units from FIG. 9.

In FIG. 9, the digital material skin units 500, 802, and 804 are all the same units rotated, as was shown previously in FIG. 7. In FIG. 10, a perspective view of the three units from FIG. 9 is depicted in terms of the entire system. In FIG. 10, the units 500, 802, and 804 are all stacked on top of one another.

Figure 11:
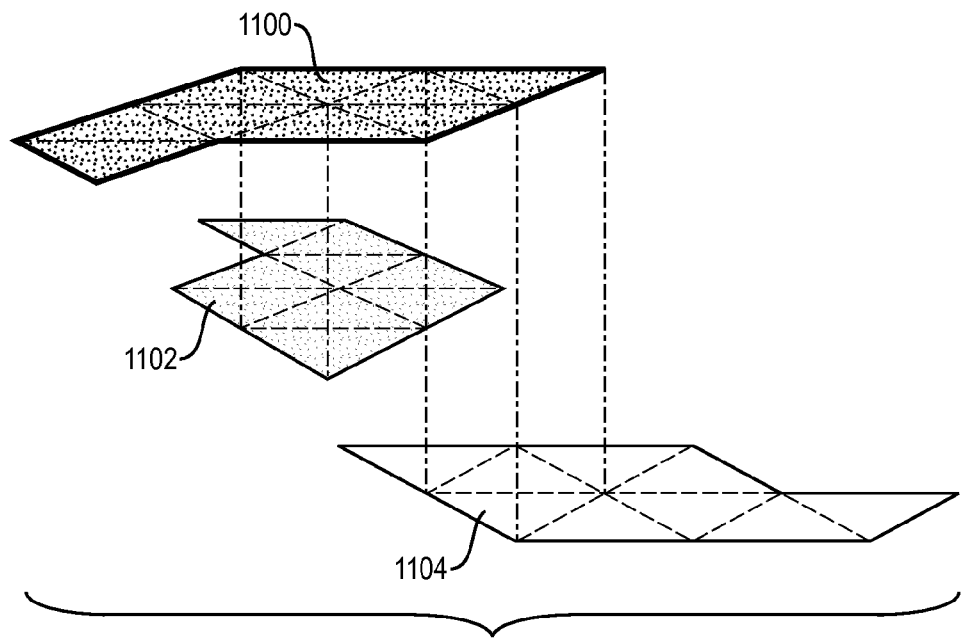
FIG. 11 depicts an alternate preferred digital material geometry, which employs unit 602 from FIG. 6.
Figure 12:
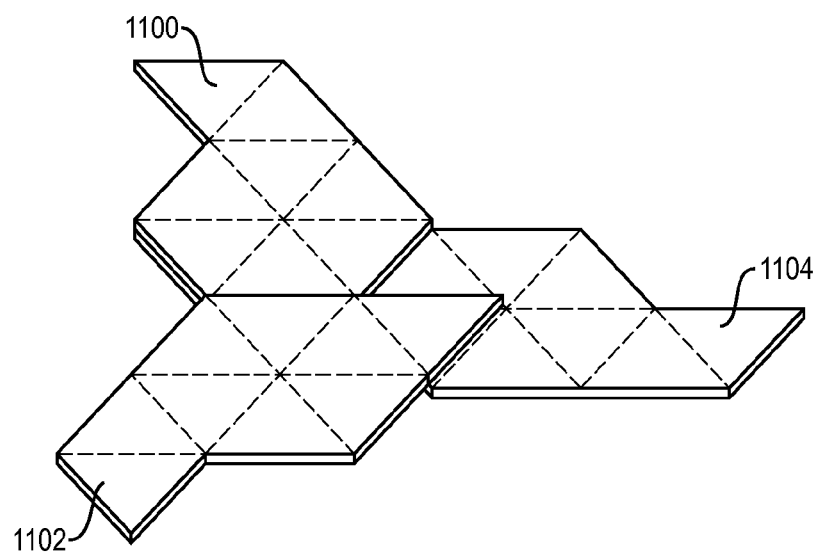
FIG. 12 is a perspective view of the assembled system of FIG. 11.

FIG. 11 depicts an alternate preferred digital material geometry, which employs unit 602 from FIG. 6. All the units 1100, 1102, and 1104 are the same unit translated in space by rotation, but this is not the only means to create such a tessellated pattern. FIG. 12 is a perspective view of the assembled system of FIG. 11.

Figure 13:
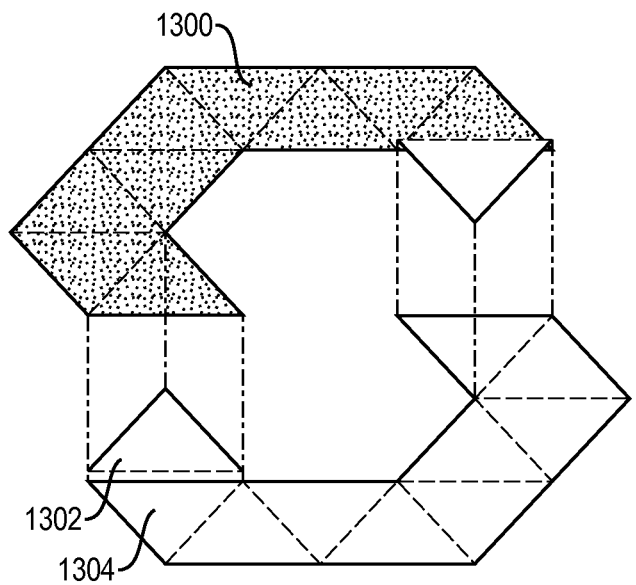
FIG. 13 depicts another alternate preferred digital material geometry, which employs unit 603 from FIG. 6.
Figure 14:
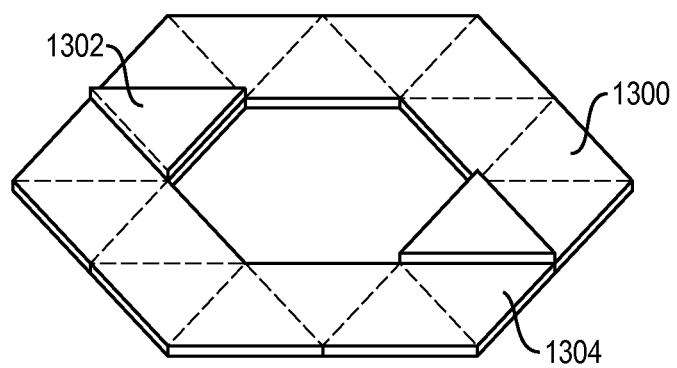
FIG. 14 is a perspective view of the assembled units of FIG. 13.

FIG. 13 depicts another alternate preferred digital material geometry, which employs unit 603 from FIG. 6. This layer is consists of two units 1300 and 1304. For example, for unit 1304, overlap takes place at 1302 and this flap rests on top of unit 1300 on one side. FIG. 14 is a perspective view of the two units 1300 and 1304, shown in terms of the entire system.

Figure 15:
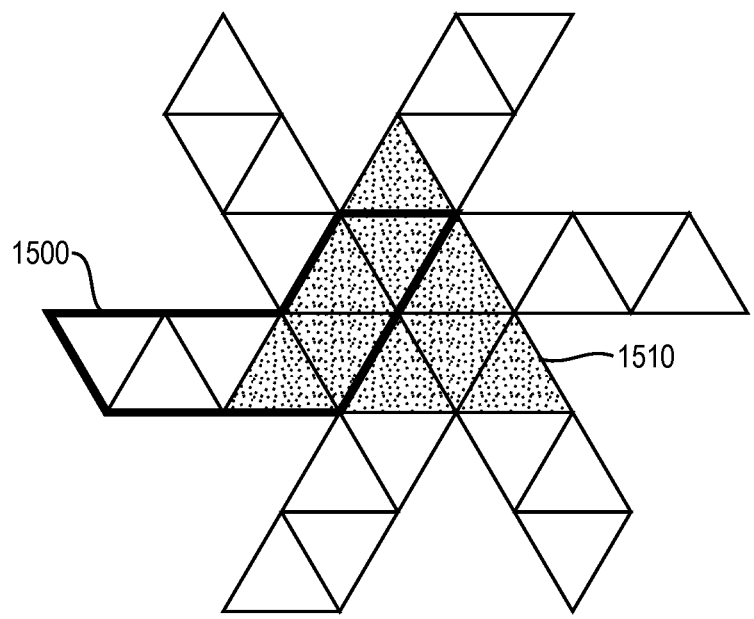
FIG. 15 depicts another alternate preferred digital material geometry, wherein the digital material composite skin is made of the same repeating unit everywhere.
Figure 16:
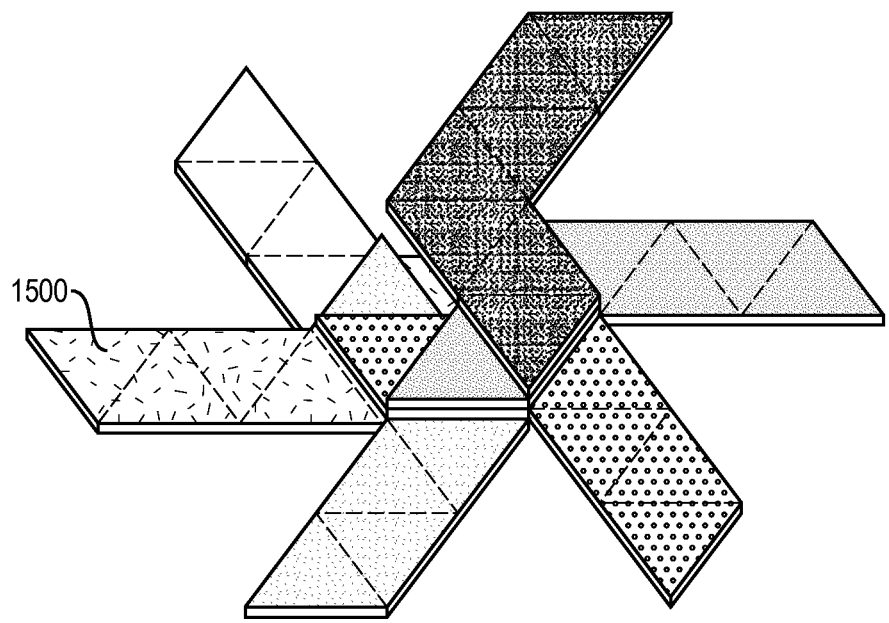
FIG. 16 is a perspective view of the assembled units of FIG. 15.
Figure 19:
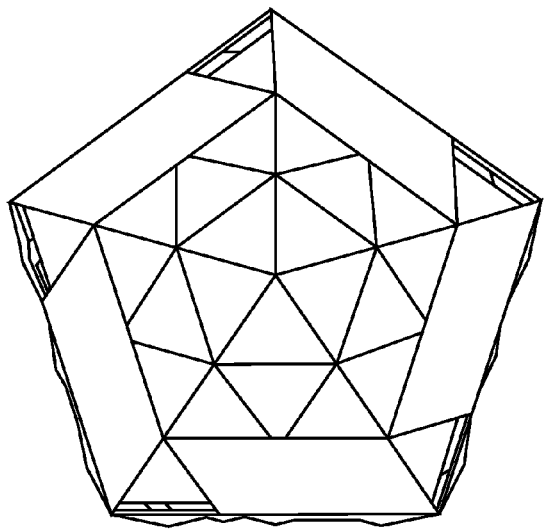
FIG. 19 depicts the exterior of an icosahedron created using digital material skin units.
Figure 21:
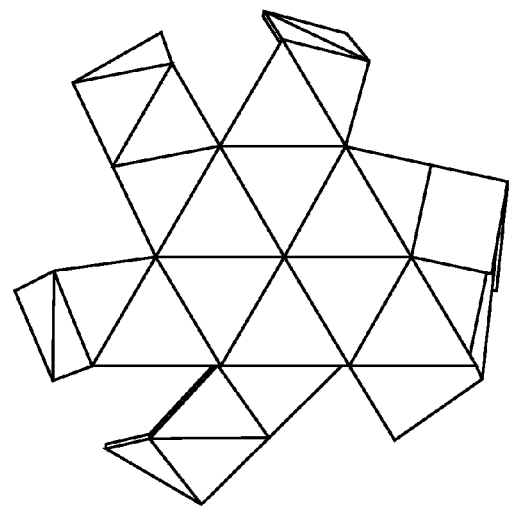
FIG. 21 depicts the repetitive panel of the icosahedron of FIGS. 19 and 20, which consists of six digital material skin units.
Figure 20:
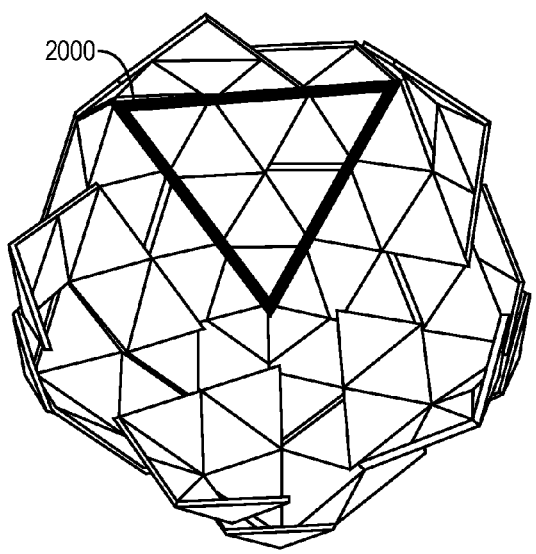
FIG. 20 depicts a cross-section of the interior volume of the icosahedron of FIG. 19.

The digital material composite skin can also be made up of the same repeating unit everywhere, as depicted in FIG. 15 for unit 1500. Two aspects of FIG. 15 are particularly significant: one being the actual skin unit 1500, and the other being shaded triangle 1510. Shaded triangle 1510 illustrates not only the fact that the digital skin units have an underlying grid pattern, but that triangle 1510 is the perimeter for the subdivided geometry based on the initial subdivision scheme. For example, if an icosahedron is the target geometry to tile, then triangle 1510 becomes the underlying panel to create into a digital material skin, since an icosahedron consists of the 20 equilateral triangles needed to enclose the volume. If the perimeter subdivision yielded a hexagonal shape, then the digital material skin units would stack similarly to create an overlapped scheme. All the units like 1500 outside of triangle 1510 would thus bend or fold to some extent, to follow the angle and geometry, as depicted in FIGS. 19, 20, and 21. FIG. 16 is a perspective view of FIG. 15, showing unit 1500 stacked with identical units by means of some translation, in this case a rotation, in order to create an overlapped skin system.

Figure 17:
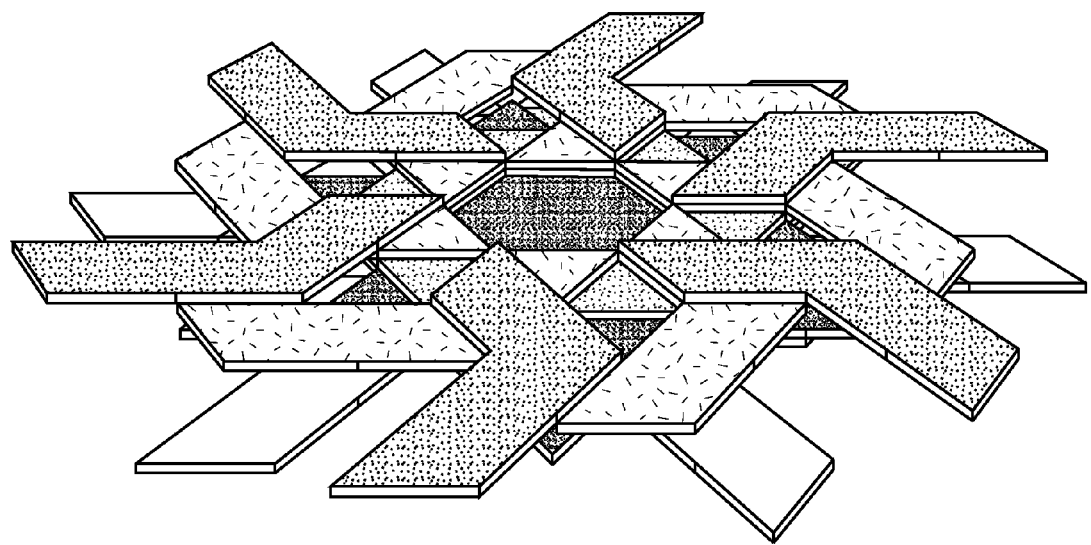
FIG. 17 is a perspective view of a larger exemplary system consisting of repetitive discrete units, again stacked on top of one another.
Figure 18:
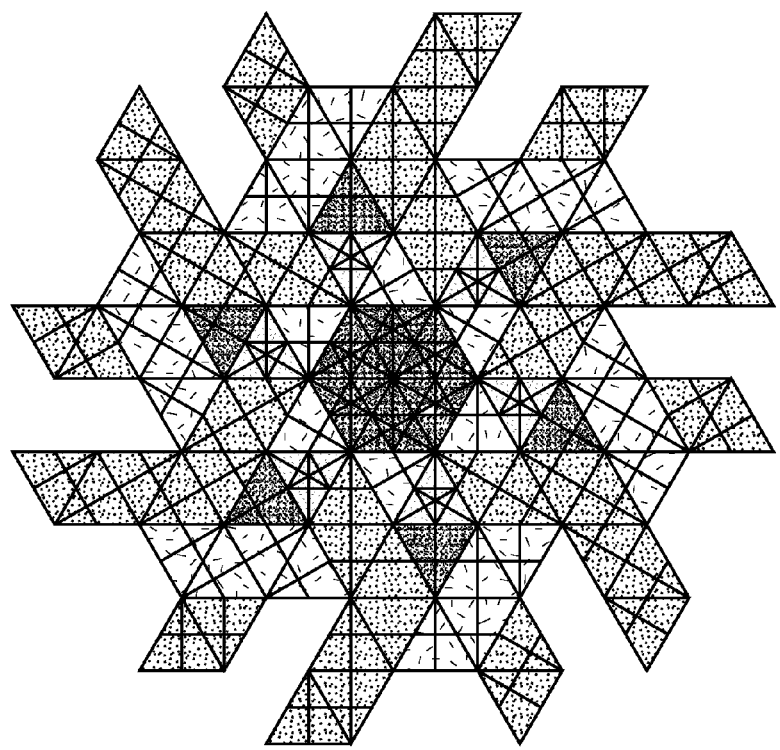
FIG. 18 is a plan (top) view of the system of FIG. 17.

FIG. 17 is a perspective view of a larger exemplary system consisting of repetitive discrete units, again stacked on top of one another. FIG. 18 is a plan (top) view of the system of FIG. 17.

FIGS. 19, 20, and 21 depict an icosahedron with 20 equilateral shapes using the most current digital material geometry which tiles by creating 3 or more overlapped areas per face, as well as other polyhedral shapes. FIG. 19 depicts the exterior of the icosahedron. In FIG. 20, the perimeter of one face 2000 is outlined and a cross-section of the interior of the volume is shown. FIG. 21 depicts the repetitive panel, which consists of six digital material skin units.

Supported Skin—A Weaving Scheme

Figure 22:
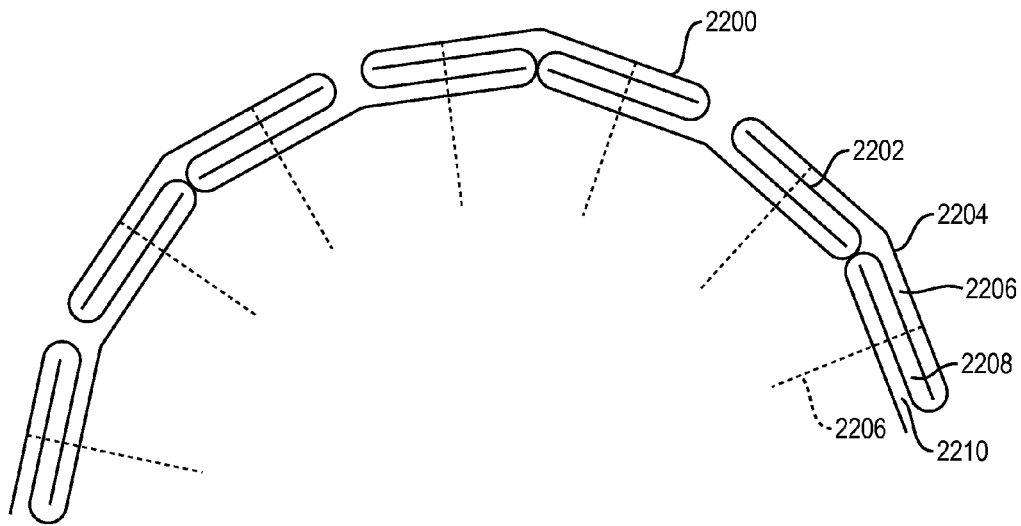
FIG. 22 depicts an exemplary digital material skin supported by another structure, according to one aspect of the invention.
Figure 23:
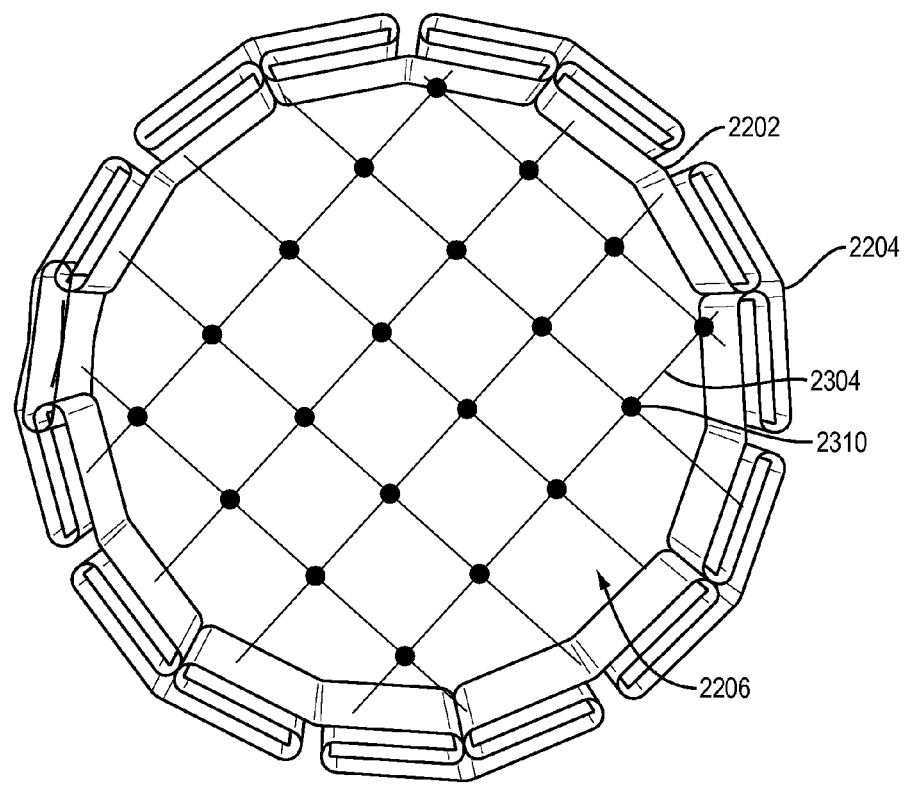
FIG. 23 is a perspective view of the skin of FIG. 22 that shows that the interior digital material volume is made up of discrete parts, with joints that connect the parts in a regular lattice structure to fill any three dimensional volume.
Figure 24:
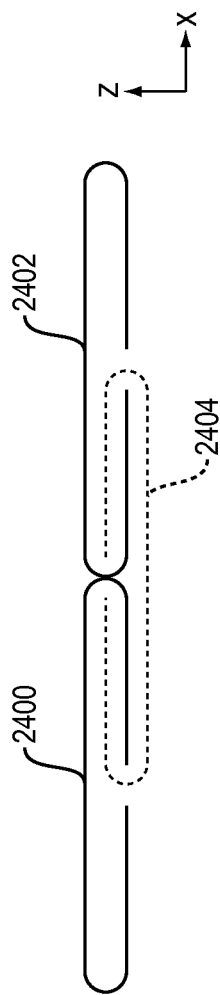
FIG. 24 depicts an exemplary three unit structure.
Figure 25:
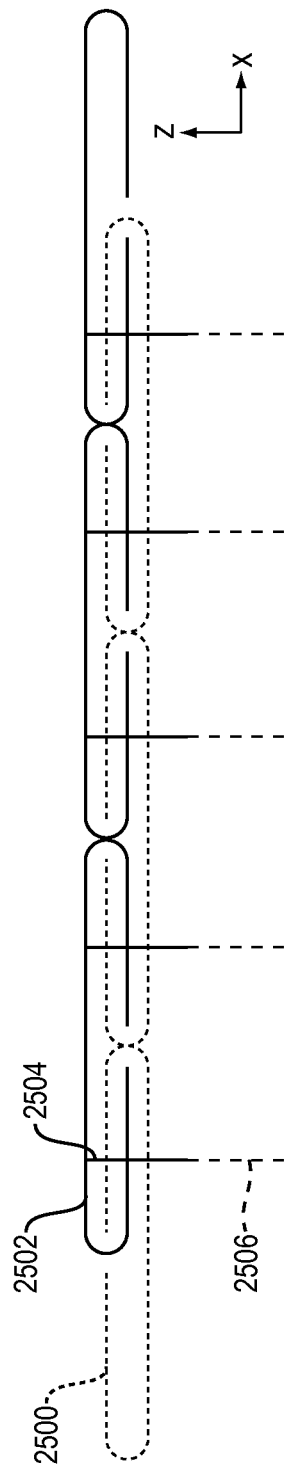
FIG. 25 depicts an extension of the structure of FIG. 24, having more units, the units being held together by a joining system.

FIG. 22 illustrates a skin supported by another structure, in this case by digital material volume 2206. The digital material skin achieves overlap by weaving the same component through an interlocking scheme whereby each unit has a section that wraps onto itself along one or more edges to simultaneously hold another interlocked piece. Unit 2202 on the interior of the skin system is interlocked by similar units 2200, 2204. The folded areas in section create interfaces in areas 2206, 2208, 2210 for any given cross-section. Digital material volume 2206 is part of the interior structure that supports the skin system at various points, which can be either regularly or irregularly spaced. FIG. 23 is a perspective view that shows that interior digital material volume 2206 is made up of discrete parts 2304 and joints 2310 that connect parts 2304 in a regular lattice structure to fill any three dimensional volume. The edge of the digital material volume which interfaces with the digital material skin has a joining system attached to the end of each digital material interior structural piece In FIG. 24, three units 2400, 2402 and 2404 are shown. In FIG. 25, more units 2500, 2502 are shown, being held together by a snap-fit, press-fit or any other kind of joining system suitable for securing units 2500, 2502 in place. This discrete joint can be attached to an interior supporting structure 2506.

Figure 26:
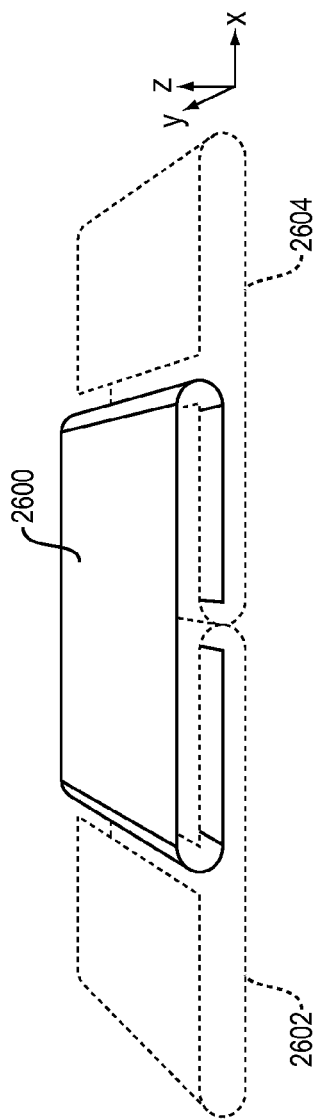
FIG. 26 is a perspective view depicting three of the same units overlapped in space.
Figure 27:
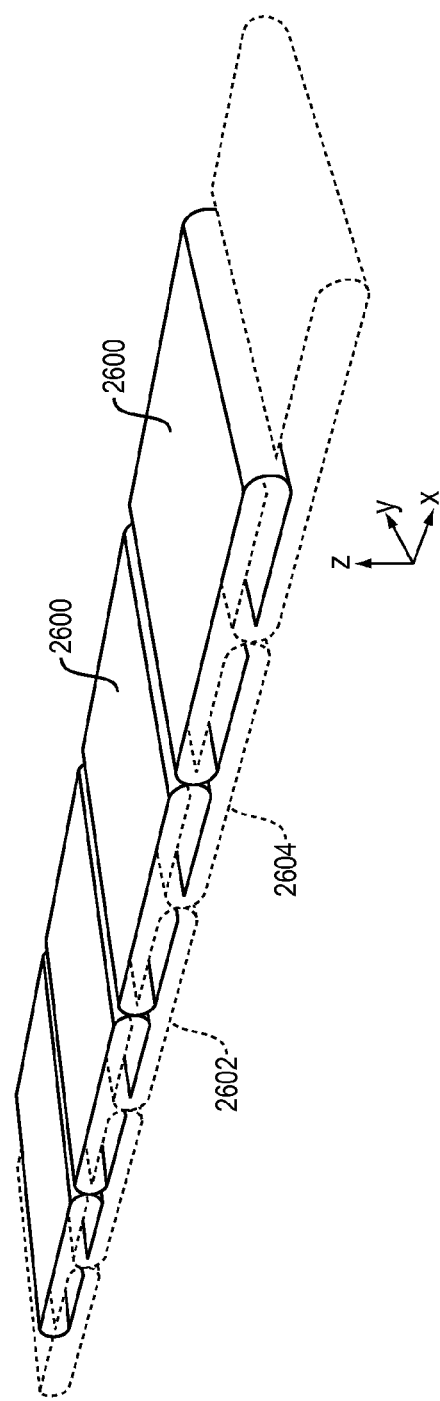
FIG. 27 depicts the same repeating unit as FIG. 26, but with more units tiling space.

FIG. 26 is a perspective view depicting three of the same units 2600, 2602, 2604 overlapped in space. In FIG. 27, the same repeating unit as FIG. 26 is shown but with more units 2600 tiling space. Unlike FIG. 25, the system in FIG. 27 would be a self-supporting skin system for a flat panel, although both digital material skin systems can tile any amorphous shape.

Figure 28:
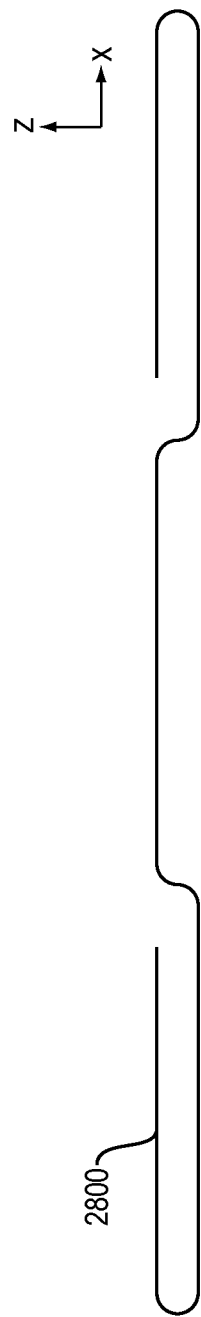
FIG. 28 is a side view of an alternate geometry for a digital material skin unit.
Figure 29:
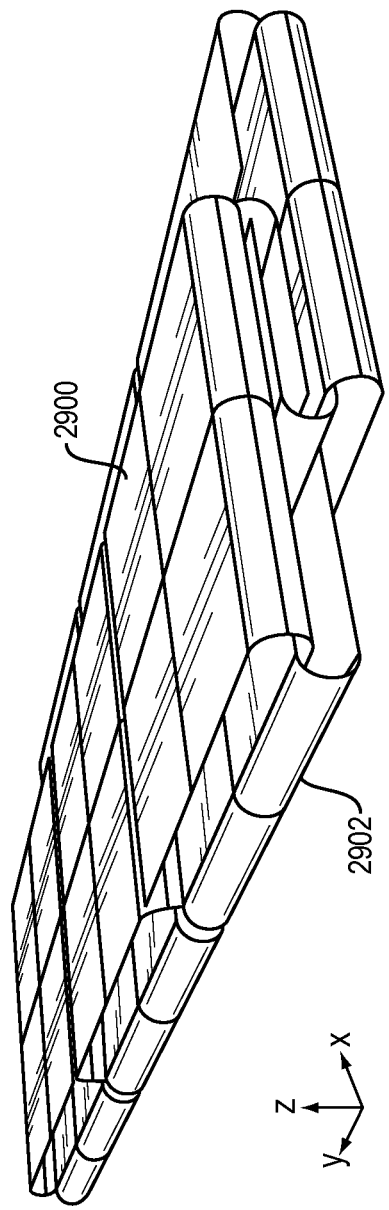
FIG. 29 depicts an exemplary digital material skin comprising the units of FIG. 28 woven and interlocked with the units of FIG. 26.

In FIG. 28, another geometry for a digital material skin unit 2800 is depicted in side view. Any digital material skin system can have one or more digital material types, although the number of variations will be less than the total number of parts in the system. When the unit 2800 is combined with the unit 2600 in FIG. 26, then the resulting system creates a weaved pattern, as depicted in FIG. 29. For example, in FIG. 29, unit 2900 which is the same as unit 2800 depicted in FIG. 28, will weave and interlock with unit 2902, which is the same as unit 2600 depicted in FIG. 26.

Figure 30:
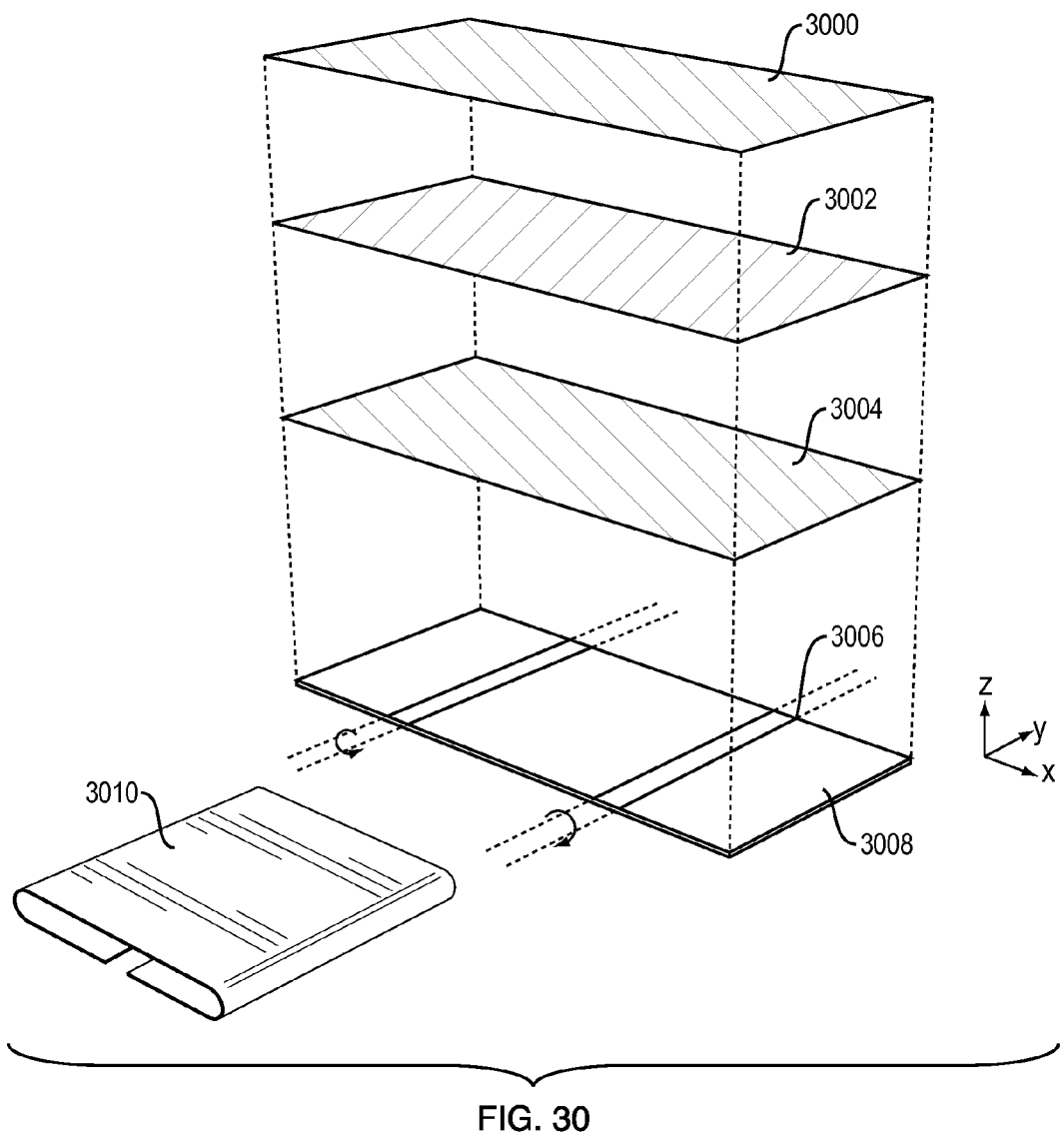
FIG. 30 depicts an exemplary digital material skin that is a composite unit made up of three plies of composites.

In FIG. 30, the digital material skin is a composite unit 3000 which is made up of three plies (could be any number of plies greater than one) of composites. Although the digital material skin unit can be made of any material, herein depicted is the option for a composite unit due to high strength and low weight advantages. Each layer has some ply orientation 3000, 3002, 3004. The manufacturing process will depend on many factors, including cost, volume of production, and time. Whichever the process, the manufacturing of composites may involve a) orientation of fiber placement, b) resin for fiber impregnation, c) removal of any excess air or resin, d) curing, e) taking the part off the mold, and e) any final finishing of the parts. Some manufacturing processes for composites may combine more than one step above into one, such as filament winding. The process will be specific to the skin unit geometry and volume. The units could have a pre-preg layup, a hand layup, or wet layup, compression molding, pultrusion, or any other process known to those skilled in the art of composite manufacturing. The unit 3010 could also have been cut out of a flat sheet of some material, such as metal, and then bent along the edges using press brakes or any other metal bending process.

Figure 31:
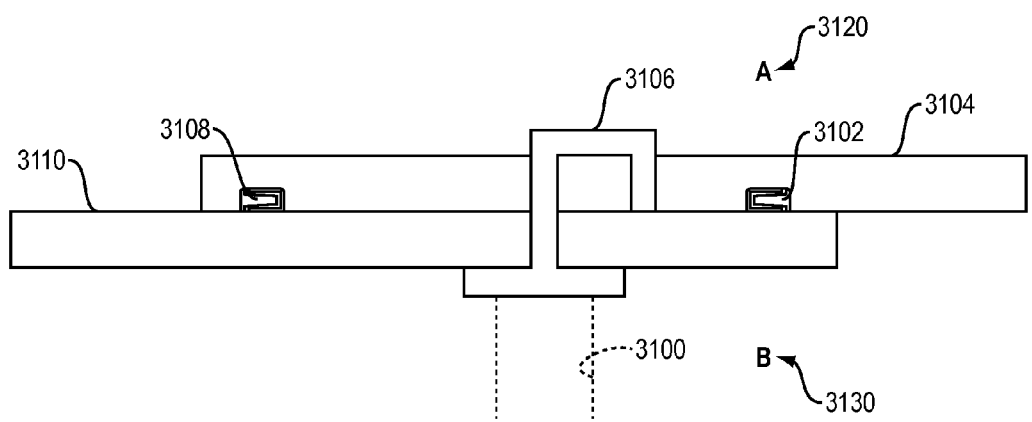
FIG. 31 depicts an exemplary overlapped skin with two interlocking digital skin units, according to one aspect of the invention.
Figure 32:
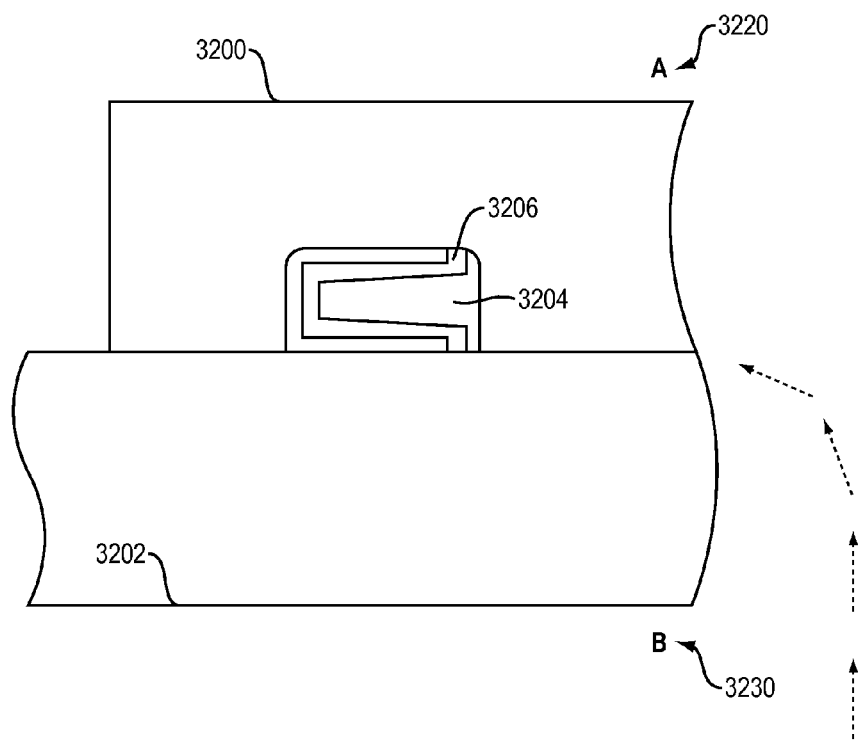
FIG. 32 shows how a pressurized skin system can experience leakage.

FIG. 31 depicts an overlapped skin with two interlocking digital skin units 3110, 3104. Joint 3106 can be a snap-fit, press-fit, or any kind of reversible joining mechanism that allows the parts to compress such that grooves 3102 milled out of one side of skin unit 3104 will allow for a metal sealant to compress with some springback against the inner groove for a completely tight seal. For example, A 3120 is the exterior and B 3130 is the interior of the skin system. In FIG. 32, A 3220 and B 3230 are also labeled to show how a pressurized skin, for example on side B 3230, will make the system leak according to the arrows. In this case, the Teflon metal seal in FIG. 32 faces the direction of leakage, such that as air or water tries to escape, the contents aid in further created a seal allowing the Inconel to want to push further out against the material thus sealing all edges even tighter. In FIG. 32, the sheet on the interior 3202 compresses against the sheet on the exterior 3200. The groove 3204 is milled out of 3200, in order to allow the Inconel or any other type of rubber oring to further compress into the groove against both materials.

Figure 33:
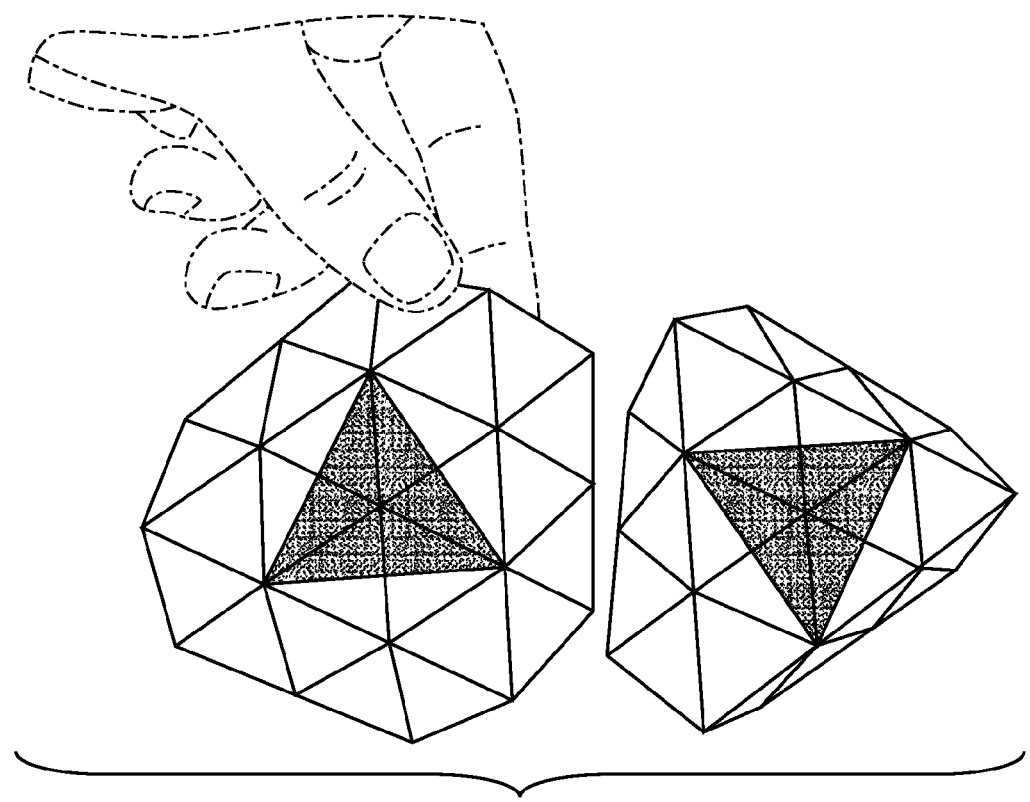
FIG. 33 depicts the discrete pieces used in the exemplary digital material skin system of FIG. 34.
Figure 34:
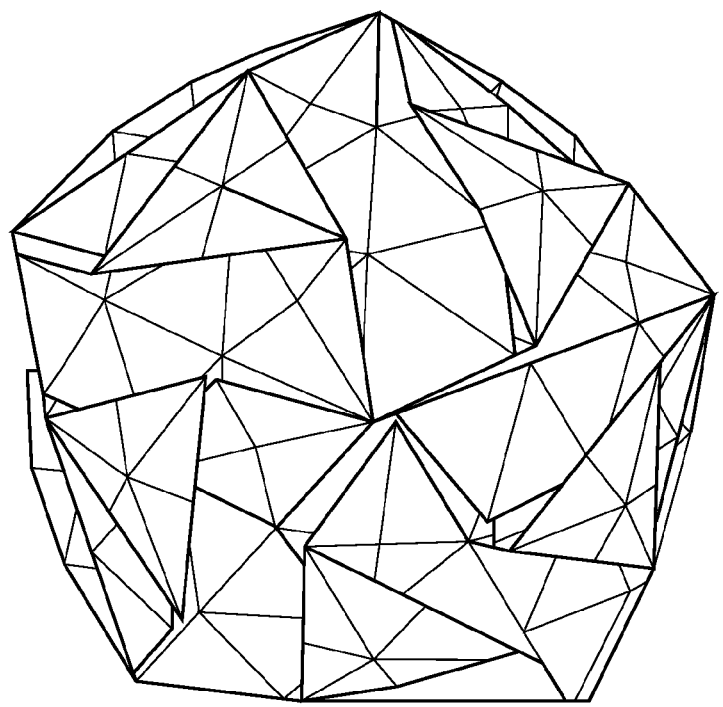
FIG. 34 depicts an exemplary digital material skin system employing a weaving skin system concept according to FIG. 22, combined with a stacking and folding system concept according to FIG. 15.

The digital material skin system for a weaving skin system concept in FIG. 22 can also be combined with the stacking and folding system concept depicted in FIG. 15, which uses symmetric overlapping tiling to create a skin with the best of both worlds and one that is more likely to work. This type of concept of the two systems merged into one is depicted in the example of FIG. 34, which is made up of discrete pieces, as shown in FIG. 33.

Pressure Vessel Application.

Figure 35:
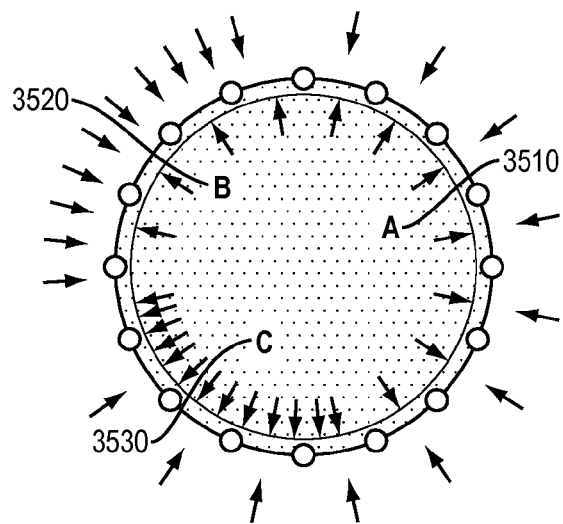
FIG. 35 illustrates the several possible scenarios associated with a pressure vessel application of the digital material skins of the invention.

A preferred application of the invention is for the construction of pressure vessels. The pressure vessel application can have any of several scenarios. Referring to the diagram in FIG. 35, Scenario A 3510 depicts equal pressure on both sides of the adjacent pressure vessel wall. Either side may have high-high pressure or low-low pressure. Scenario B 3520 depicts a low pressure interior, and higher pressure exterior skin. Finally, scenario C 3530 depicts a high pressure interior and lower pressure exterior.

Figure 36A:
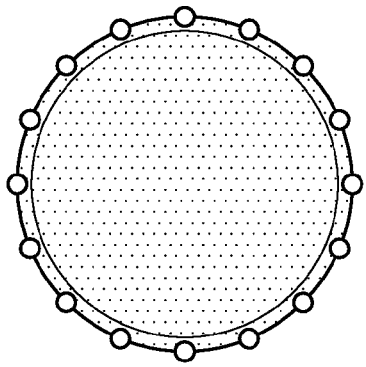
FIGS. 36A-D depict several digital material skin strategies, including one layer and two or more layer of an open or enclosed self-supporting skin system.
Figure 36B:
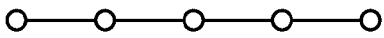
Figure 36C:
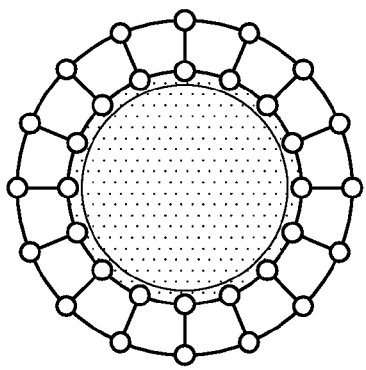
Figure 36D:
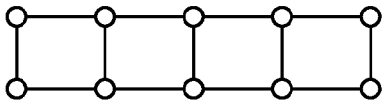

FIGS. 36A-D depict several digital material skin strategies, including one layer and two or more layer of an open or enclosed self-supporting skin system. FIG. 36A depicts the first type of skin strategy. It is comprised of a single layer system of an enclosed free-form digital material skin with some differential internal and external pressure. FIG. 36B depicts a single layer system of an open free-form digital material skin with some differential internal and external pressure. In FIG. 36C, the diagram depicts a two or more layer system of an enclosed free-form digital material skin with some differential internal and external pressure. FIG. 36D is a two or more layer system of an open free-form digital material skin with some differential internal and external pressure.

Figure 37A:
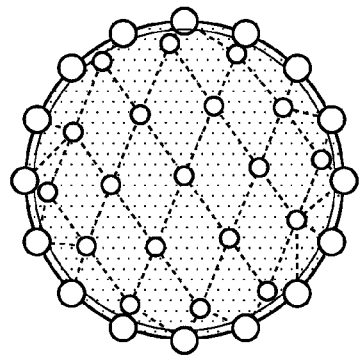
FIGS. 37A-E illustrate a second exemplary strategy of digital material skins, including one layer and two or more layer of an open or enclosed skin system supported by an interior digital material solid core.
Figure 37B:
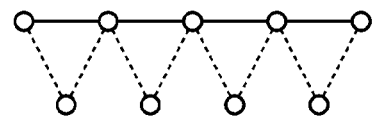
Figure 37C:
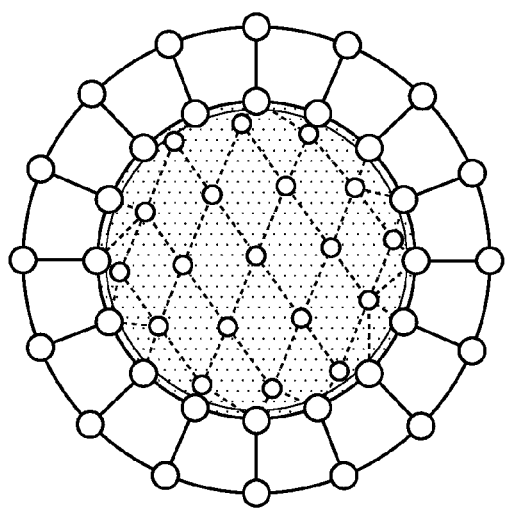
Figure 37D:
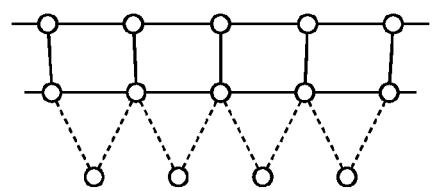
Figure 37E:
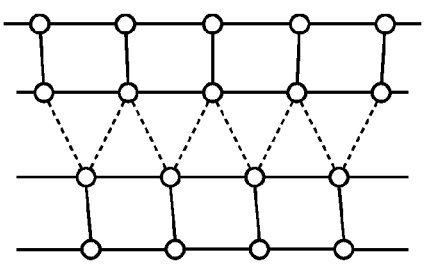

FIGS. 37A-E illustrate a second exemplary strategy of digital material skins, including one layer and two or more layer of an open or enclosed skin system supported by an interior digital material solid core. FIG. 37A depicts a single layer system of an enclosed free-form digital material skin with some differential internal and external pressure supported by an internal structural core or digital material solid (indicated by dotted lines). FIG. 37B depicts a single layer system of an open free-form digital material skin with some differential internal and external pressure supported by an internal structural core or digital material solid (indicated by dotted lines). FIG. 37C depicts a two or more layer system of an enclosed free-form digital material skin with some differential internal and external pressure supported by an internal structural core or digital material solid (indicated by dotted lines). FIG. 37D depicts a two or more layer system of an open free-form digital material skin supported by an internal structural core or digital material solid on one side (indicated by dotted lines). FIG. 37E depicts a two or more layer system of an open free-form digital material skin on one or both sides, supported by an internal structural core or digital material solid (indicated by dotted lines).

The design methodology for digital material skins begins by determining what global form or geometry is desired. Once the form is determined, it is then subdivided. Given some configuration, subdivision and panelization of the surface is created, to populate the interior with 2-3 scales of a digital material skin used to achieve some resolution of the final form. Since each part is inherently discrete and 2D, the design is then translated to GCode. Each unique 2D element is translated to numerically controlled machine code depending on the tool used. The designs are then created as individual components using either an additive or subtractive manufacturing method, also greatly influenced by the material to be used. The next step would include assembly of the digital material skins by a digital material printer, which uses a pick and place mechanism to interlock components in the structure. Once the structure is built, then material testing of the substructure and larger bulk structure takes place to characterize properties of the bulk material skin system. When the structure is no longer needed, it is then disassembled by the same digital material assembler.

A pressure vessel is envisioned as a primary application for digital material skins because pressure vessels are some of the most ubiquitous applications across societies for hundreds of years. It will be apparent to one of skill in the art, however, that the pressure vessel embodiment can be generalized towards any application that requires an airtight and waterproof skin, and represents the most challenging of applications.

Figure 38:
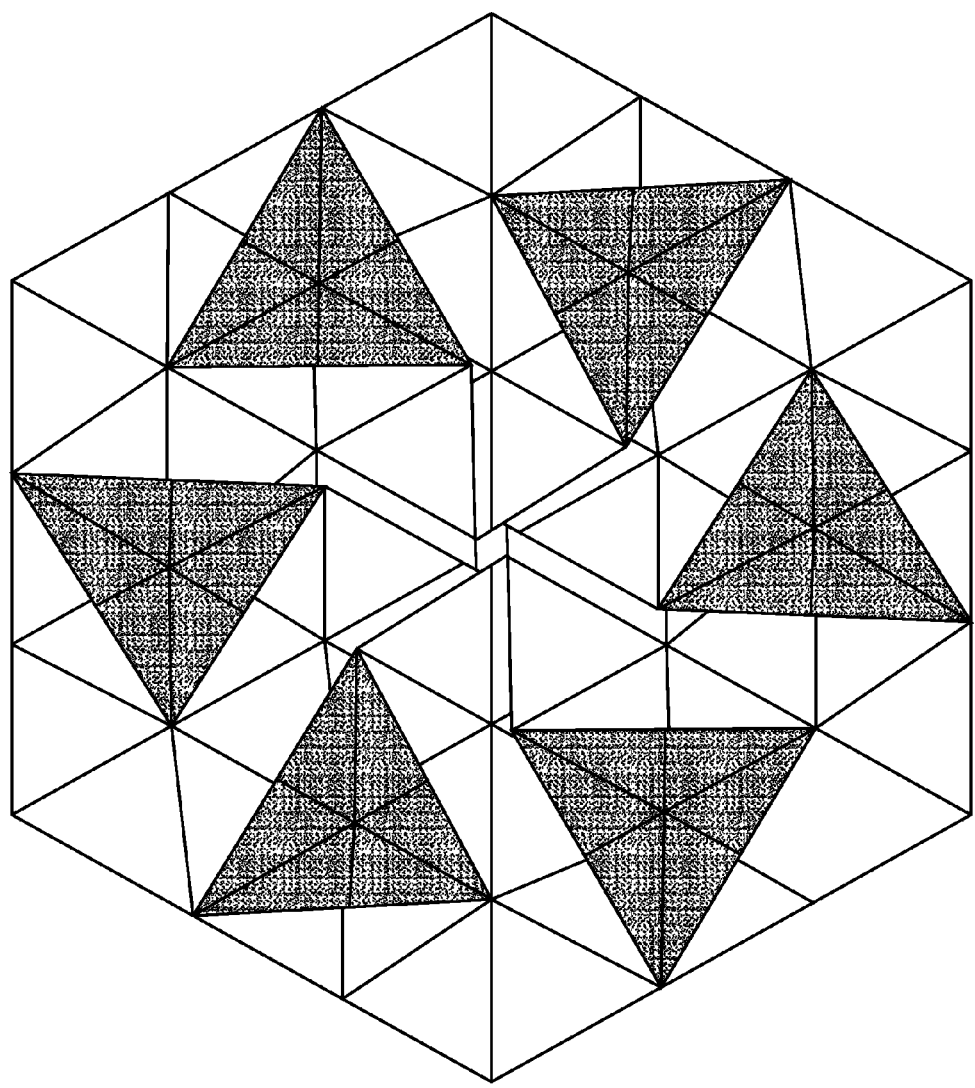
FIG. 38 depicts a 2D fat digital material skin system made of 6 repeating and interlocking components.

The final skin configuration can be traced back to the initial subdivision of the spherical surface. To simplify, an icosahedron with 20 identical equilateral triangles which make up the faces was used, and a new strategy for the self-supporting skin was developed based on origami tessellation. All tessellation patterns are based on repetitive geometries which tile two-dimensionally without creating any gaps or overlapping in the system. These properties are ideal for thinking about how to approach and develop a repetitive standard material unit and geometry that tiles in two- and eventually three-dimensional space. The pattern must fit without gaps, but it must simultaneously provide overlap to constantly redirect matter from one point to another. Ideally, the overlaps are such that they decrease in elevation and direct matter in one continuous direction, allowing liquid to flow perpendicular to the edges of overlap. FIG. 38 depicts a 2D fat digital material skin system made of 6 repeating and interlocking components.

There are three tiling systems, grids or tessellation patterns: squares, equilateral triangles or hexagons. Since these tilings are two dimensional with no gap and no overlapping patterns, there must be a method to go about including overlapping into the tessellation, for the application to function as a sealed skin. We looked towards origami tessellations, a subset of tessellations which create repetitive geometric designs by folding a single sheet of paper. Depending on the grid, the final folded design can either stack and propagate, or expand homogeneously throughout the paper.

Origami tessellations do not typically involve cutting any part of the paper being folded, and patterns use the full sheet to propagate the design by folding. A pattern first is developed by choosing the grid type and then pre-creasing the grid on a sheet of paper. The difference with origami tessellation and what the research has proposed, is to use origami tessellation to identify repeating overlapping components, to cut these identical components out of that already folded pattern, and to evolve the design of the part such that each component has areas along the edges of the outer triangle or hexagon perimeter, which fold and slide under adjacent overlapped areas.

Once the overlapped geometries are identified, the next step is to translate the paper model into a physical model made of everyday materials. Paper folds easily, but the challenge is to evolve the component such that they can eventually translate to discrete components. One can achieve the same objective in later models of the component constructed out of wood, metal or carbon fiber composites. The origami tessellation for the digital material skin system was initially folded and based on a triangular grid creating a repetitive triangle twist pattern. A triangle twist and a hexagonal twist are the two simplest origami folds one can create.

Figure 39A:
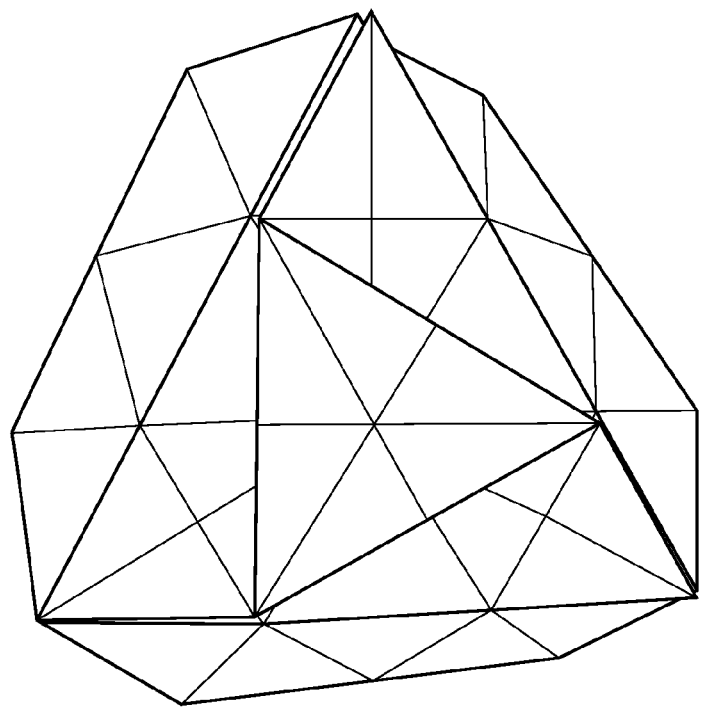
FIG. 39A depicts the digital material skin unit and FIG. 39B depicts the origami Tesselation mountain-valley fold pattern for this embodiment.
Figure 39B:
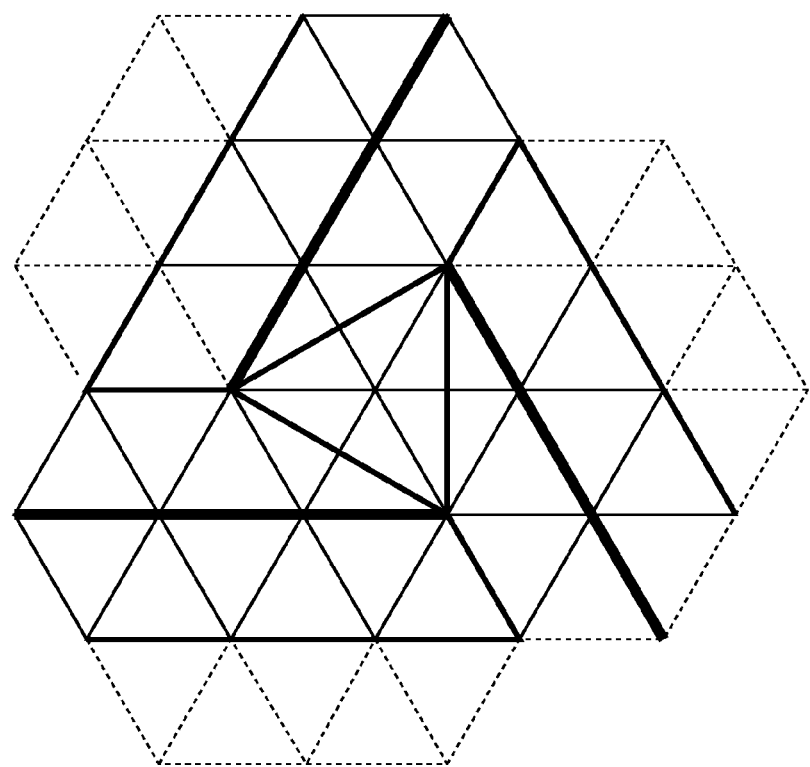

The triangle twist for example, creates 3 overlapped areas that share a common point. These three areas or strips are then mirrored along their outer triangular edge to create flaps on three sides of the triangular base. FIG. 39A depicts the digital material skin unit and FIG. 39B depicts the origami Tesselation mountain-valley fold pattern for this embodiment. The triangle twist could also have been superimposed on a hexagonal shaped panel for the outer edge, but for convenience of the icosahedron faces, the triangle remained. To further clarify, whether a triangle twist or a hexagonal twist is created, the base of paper under the fold can be conceived as any geometry or shape the designer chooses, depending on the system and shape of the subdivided geometry.

Figure 40:
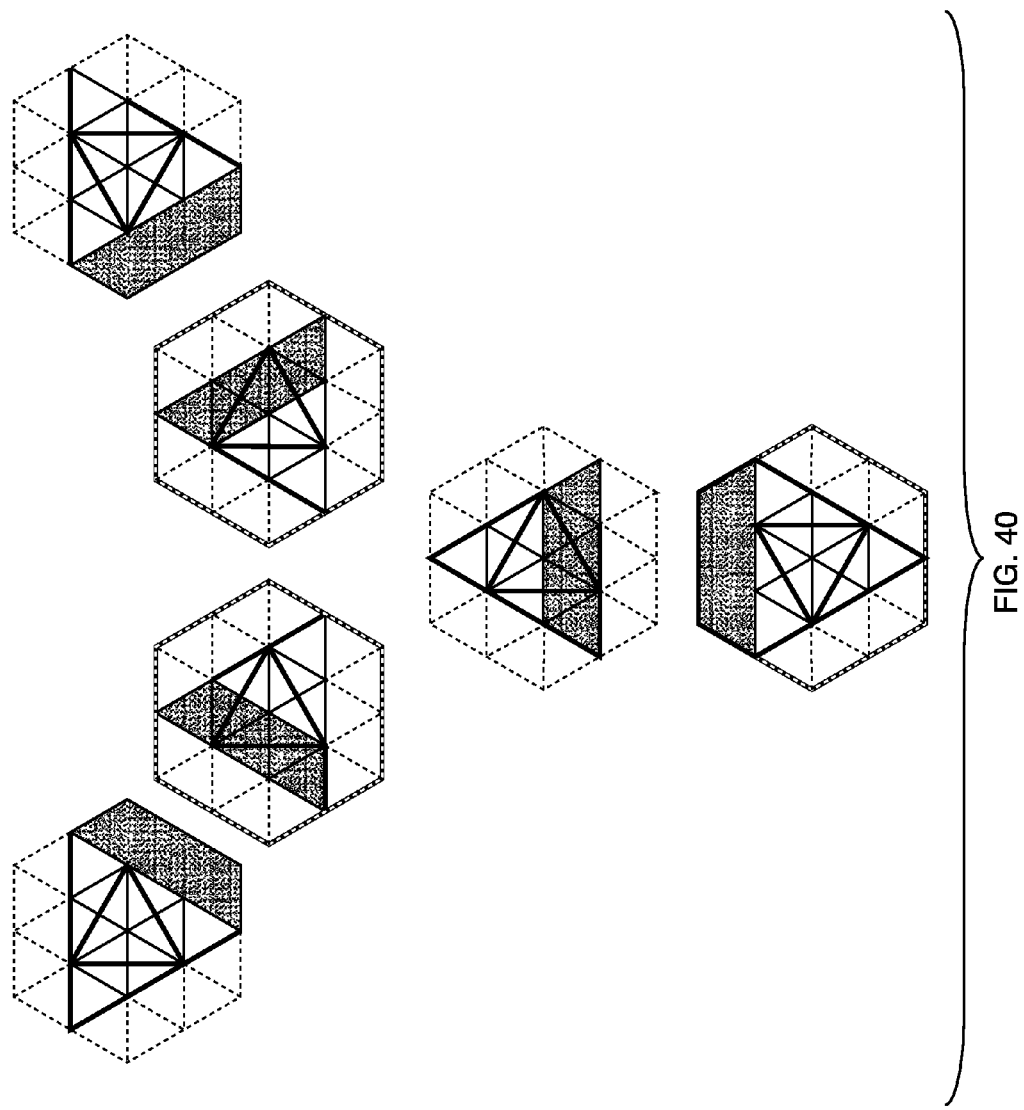
FIG. 40 depicts where adjacent units interlock for the embodiment of FIGS. 33 and 34.

Now that each digital material component features a triangle twist and three flaps, one could imagine tiling this component infinitely by sliding the flaps of every component under the adjacent components overlapped sections. The digital material skin component consists of a pleated area and aps. Each equilateral triangular face on the icosahedron is now made up of 3 identical overlapped strips which are the digital material units. They are then combined from adjacent triangular units to create double strips folded along every edge of the icosahedron. This creates a seal by covering all the edges of the icosahedron. It is also important to mention that the outer and innermost layers of the skin both display similar overlapping patterns to further create barriers for leakage in the system. The next goal is to then design a bistable rigid and high strength joint which penetrates in cross-section through two or more digital material components to link the structural skin together. As depicted in FIG. 40, each shaded flap illustrates where the adjacent unit interlocks.

The surface is designed as a multi-layer composite skin system, with every layer completing one or more important functions. The concept of multi-layered and multi-material composite skin is demonstrated in the work of the Harvard Monolithic Bee (Mobee), which uses folding and pop-up microfabrication with lasercut patterns of 8 different layers combining both rigid and flexible materials that function as beams and joints in the system. A diagram of the digital material skin system is illustrated below. The layer on the exterior is a stiff and high strength material which defines the part geometry and shields the interior contents from the exterior. The next layer is kapton film, which provides flexibility and strength in tension. The third and final layer on the interior is a thin gasket sheet.

Figure 41:
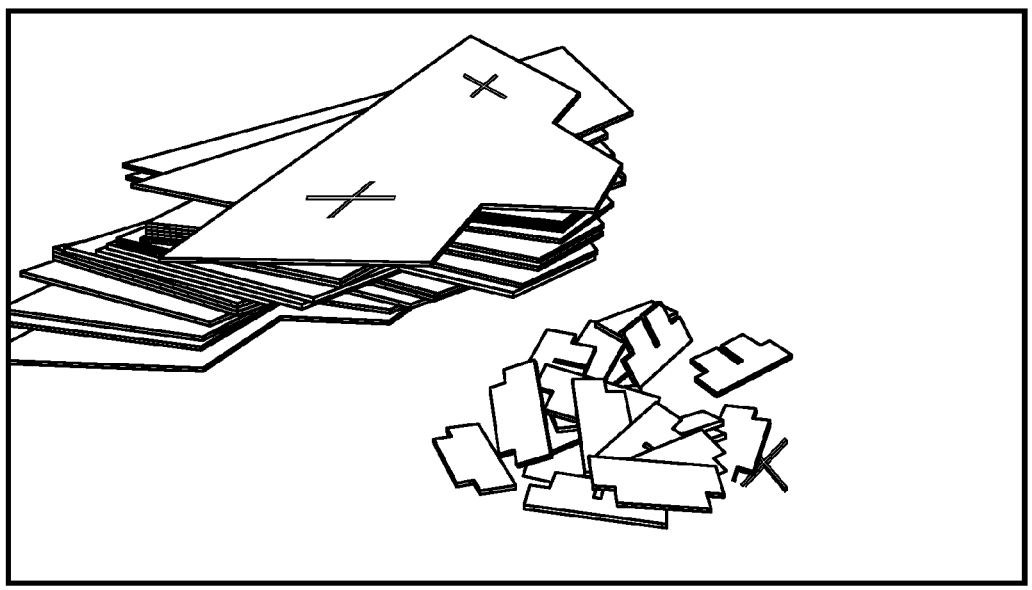
FIG. 41 depicts joint inserts and rigid components for the outermost layer of the pressure vessel prototype.
Figure 42A:
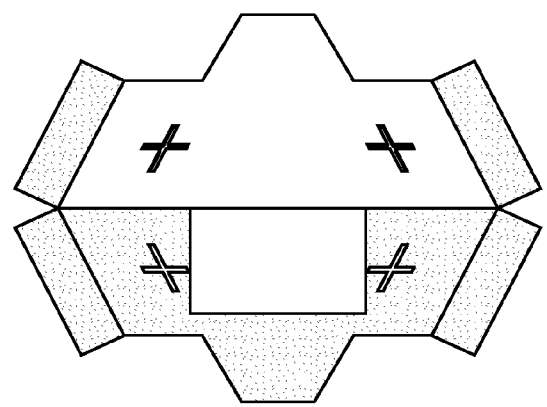
FIGS. 42A-C depict the rigid exterior and flexible interior with inserts penetrating through several skin layers for the pressure vessel prototype.
Figure 42B:
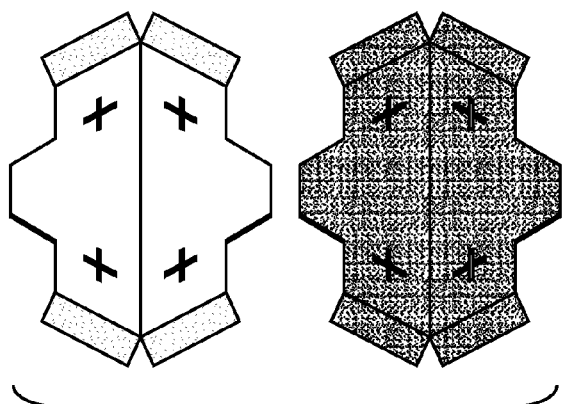
Figure 42C:
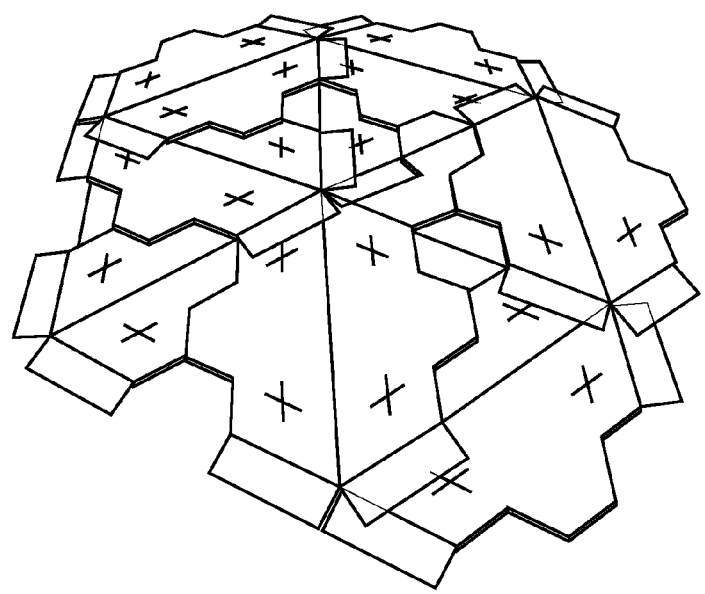
Figure 43A:
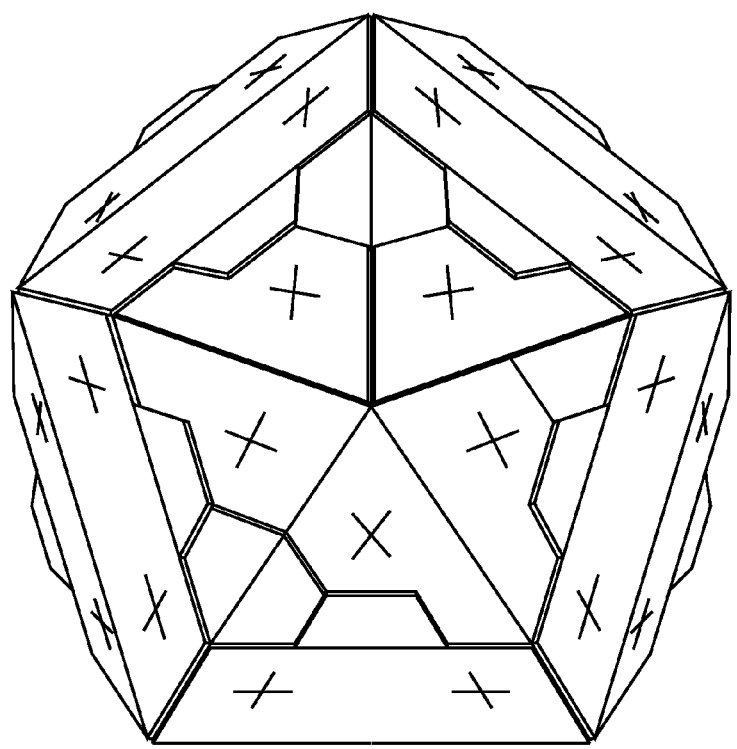
FIGS. 43A-B depict the rigid exterior layer of the prototype digital material skin.
Figure 43B:
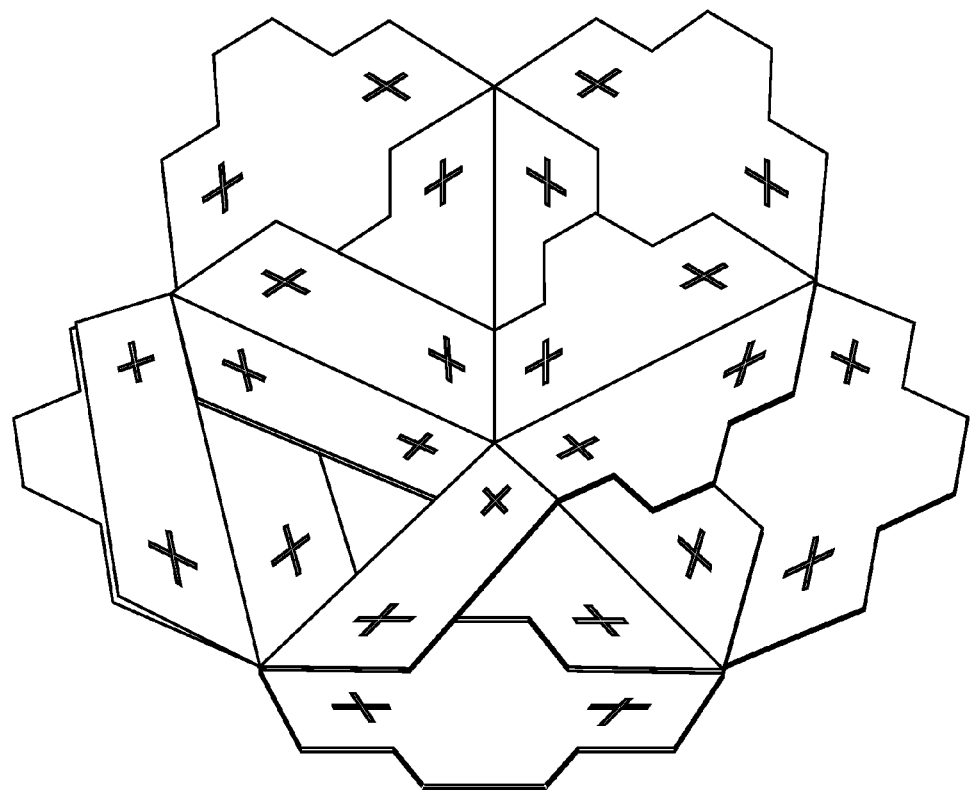

For the construction of the physical prototype, which initially was just a flat skin, several materials were tested for each layer. The outer most layer was made of 1/32" birch plywood that was lasercut with a line etched along the center of two adjacent components to allow the units to bend together. This layer would eventually become a carbon fiber material. This second layer is HN kapton polyimide film at 100 FPC, providing flexibility along with a thermal barrier for applications up to 400 C. The ultimate tensile strength of this film type is 139 MPa, an elongation of 83% and a density of 1.42 g/cc. This is currently used as a flexible joint in the model applied with an adhesive backing, but eventually would only function as a thermal barrier. The third layer is the gasket layer, and several gasket and rubber materials were tested in the first physical prototype. Vegetable fiber gaskets are impregnated with a compound which protects against water and oil, and although this demonstrated good absorption, the exterior side of the fiber was also wet after the initial test. The red gasket in the image is SBR Rubber, while the brown is a cork and rubber blend. Additional gasket materials to look at include high temperature carbon and graphite gaskets, corrosion resistant gaskets, and ultra-high temperature gaskets made of alumina ceramic fibers that can withstand up to 2600 F. Adhesives are only used to secure the kapton layer to the wood, while the press-fit pin secures all layers in cross-section. FIG. 41 depicts joint inserts and rigid components for the outermost layer of the pressure vessel prototype. FIGS. 42A-C depict the rigid exterior and flexible interior with inserts penetrating through several skin layers. FIGS. 43A-B depict the rigid exterior layer of the prototype digital material skin.

The current physical prototype has inserts that press-fit from the exterior and shift and lock on the interior. This is the key property which allows for reversibility of the structure. The pins are pushed and locked in place by hand, but one could imagine a digital material assembler which would pick and place each joint quickly and easily speeding up fabrication time. A square foot of this composite digital material skin was tested by pouring water on the gasket side of the model. After a few minutes, there was leakage on the exterior side of the model.

Figure 44:
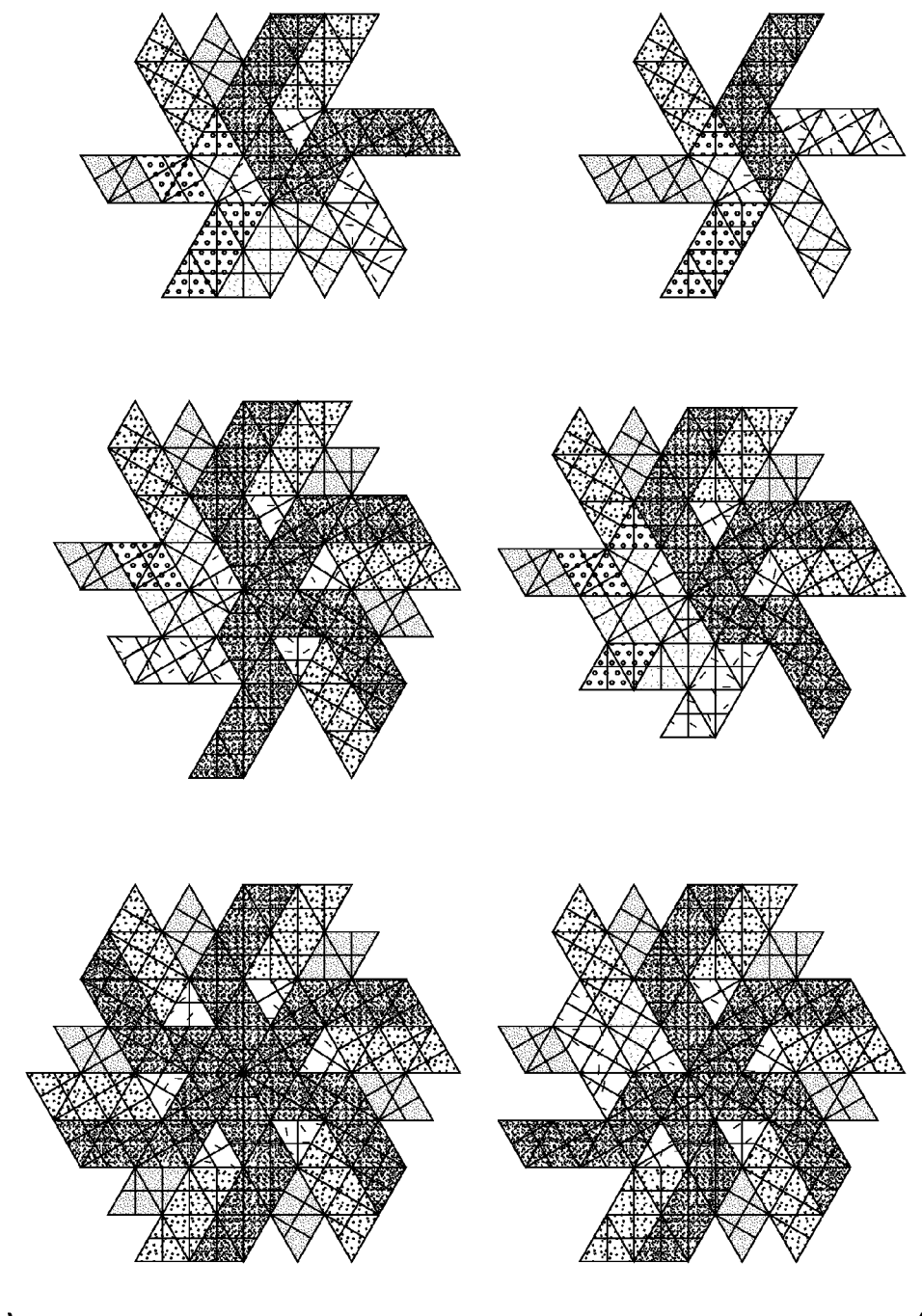
FIG. 44 depicts a close packed configuration of an overlapping digital material skin system.
Figure 45:
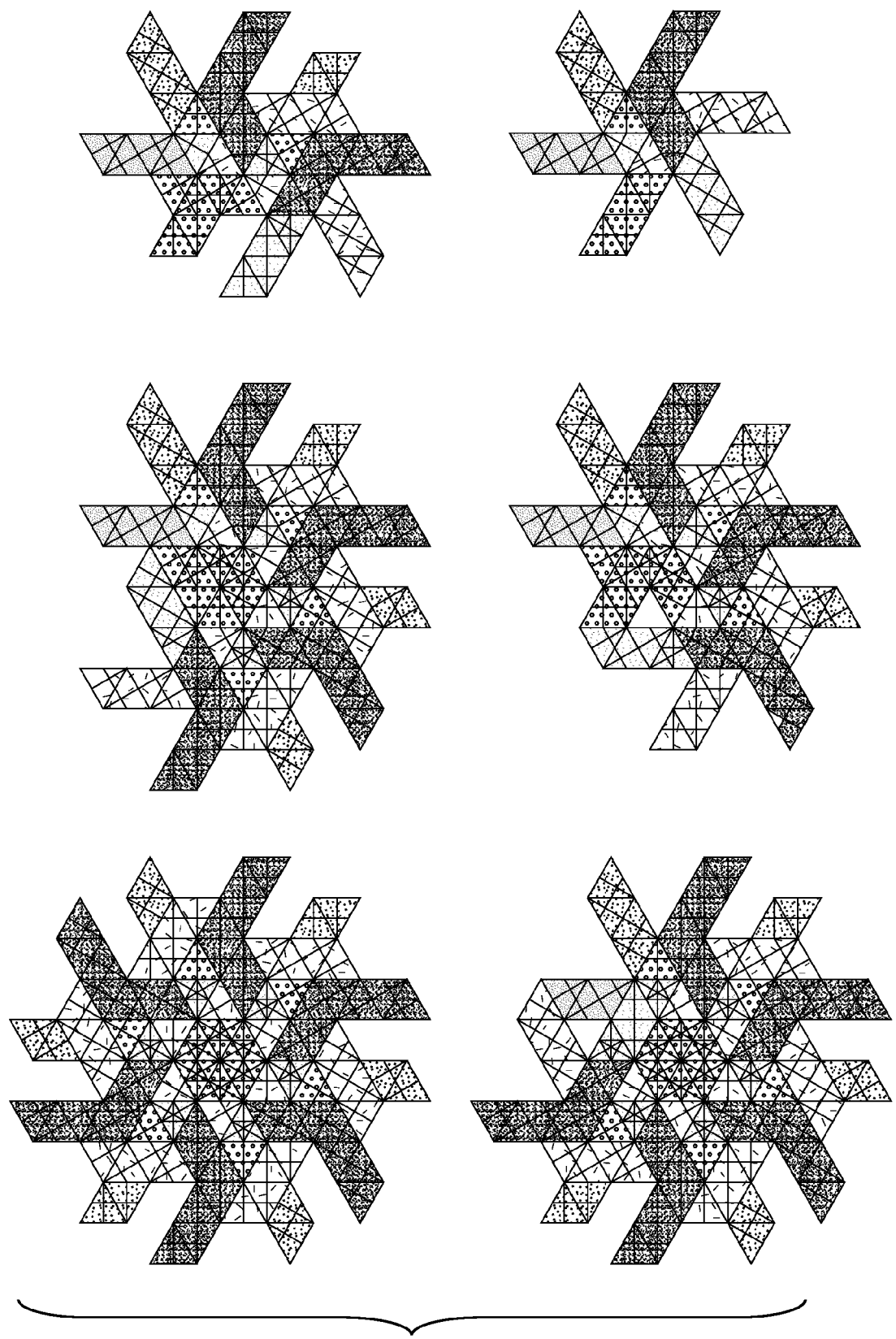
FIG. 45 depicts an alternate configuration of an overlapping digital material skin system, wherein the strips are spread out.

The problem with this model is that the inserts for the joints are exposed on both sides, and it is believed that if the skin is designed such that the rubber gaskets also overlap on another layer to cover each joint on the interior, then there should be no way for the water to permeate the skin. Each color represents a different layer in the skin system. The design for the part geometry is in the shape of an L, confined at one end into the skin while the other end is a loose flap which covers an existing joint directly below. FIG. 16 shows the same shape forming one flap of an icosahedron face or equilateral triangle by simply rotating the same geometry. Six strips form one equilateral triangle face. FIG. 44 shows the geometry tessellated and closely packed, while FIG. 45 shows the strips spread out. Future work will identify how the joints and number of layers change depending on the configuration of the tiles. Future work will also identify how this system can be used to tesselate a sphere.

One of the first applications of digital material solids was an aircraft wing wedge. The goal of these materials is to efficiency distribute loads across structures. For applications such as transport, this requires the ability to transmit loads to the external environment, in order to achieve a net force vector in the desired direction of travel. A method of interfacing between the periodic digital structure and the outside environment provides two important capabilities. If the characteristic length scale of variation in the application load map is less than the digital material cell size, then this allows for local distribution of loads onto the structure, via a cellular skin. If there are peaks in the application load map that exceed the design limits of small areas of the structure, then effective smoothing of this load map can be accomplished with a skin design whereby cells also distribute loads onto neighboring cells. An extreme limit of such a digital cellular skin is essentially a digital composite in surface form, with tunable response to hoop stress, but for now the focus is on the more basic architecture where each interface or skin cell is responsible for transferring load only to the underlying lattice unit that it is attached to.

The digital material solids/aircraft wing wedge prototype is the first application of digital material solids towards the design of an aircraft wing wedge structure. Related to a cellular material, this digital material, or digital material solid is designed to replace the interior structure of a wing wedge, and ultimately any aircraft load bearing interior structure. Digital material solids have previously been applied towards the design of a desktop printer out of discrete reversible parts. The aircraft wing is the first application to consider the design of a digital material solid out of composite materials, similar to a cellular solid, with constraints that the structure be extremely strong and lightweight. The major requirement for an aircraft skin, is its' resistance to compressive stresses, in order to prevent the entire structure from buckling. Buckling is mitigated by providing a stiff but lightweight material core connected to an exterior skin which performs aerodynamically. The skin may or may not be load bearing depending on loading requirements. Aircraft core construction is analogous an I beam, with the skin of a core functioning the same way the top and bottom flange would on a beam, and the inner core in a sandwich similar to the web of a beam.

The interior of the wing wedge is designed as a cellular solid, a repetitive lattice with standard elongated shapes which interlock with a reversible insert in each joint, to allow for easy assembly and disassembly for ultimate reusability, recyclability and repairability. Another objective was to design a hierarchical geometric space filling shape, such that it would be scalable to allow for greater surface resolution of the final structure. If not scalable, there could also be different variations of the initial part geometry, such as half shapes or quarter shapes of the original. Also, the parts had to be milled out of fat sheets of material utilizing subtractive fabrication methods to allow for quick, easy and greater control over the fabrication process. Finally, the goal was to create an isotropic structure, such that the properties of the geometry and material would be the same in every direction of the bulk material. The ultimate goal was to create a lightweight and highly porous structure for a wing with a stiff cross-sectional core analogous to spars in a wing or fuselage.

The first step involved a series of design studies for a proof of concept lattice structure to fill three dimensional space. In two dimensions, there are five different lattice configurations: square, hexagonal, parallelogrammic, rectangular and rhombic. In three dimensions, there are 14 different lattice shapes, commonly referred to as Bravais lattices. The design typically begins by choosing a lattice type and then proceeds with a geometry which repeats across the entire lattice in all directions.

Design strategy 1 is a space-filling polyhedron also known as a tetrahedron. It is hierarchical and scalable because it features three different tetrahedron sizes. The disadvantage with this proof of concept lies in the weak connections between adjacent interlocked 2D parts. Each 2D geometry meets at a plate connection, and the plates hold in compression while the diagonal members serve to hold in tension. The connection between the diagonal members and plates requires a better strategy for stiffening the joints. Design strategy 2 is a space filling geometry based on a body centered lattice with t shaped members. This strategy does not fulfill a hierarchical system in the sense that the model only features half shapes of the original. The strategy needs to incorporate three or more different sizes of the same component scaled up with the same connections. Structurally, the system relies on stiff joints acting in tension and compression. This strategy demonstrates the greatest potential because of its joining system, and the next iteration would feature snap-fit or press-fit joints for a stronger connection. Design strategy 3 is a space filling geometry that fulfills the hierarchical requirement but works as an anisotropic structure which fails the requirement of isotropy. Furthermore, the joining system relies on press-fit joints that are weak and direction dependent. Since strategy 2 demonstrated the greatest potential, it was further developed in the next phase of design and fabrication of the wing.

Figure 46:
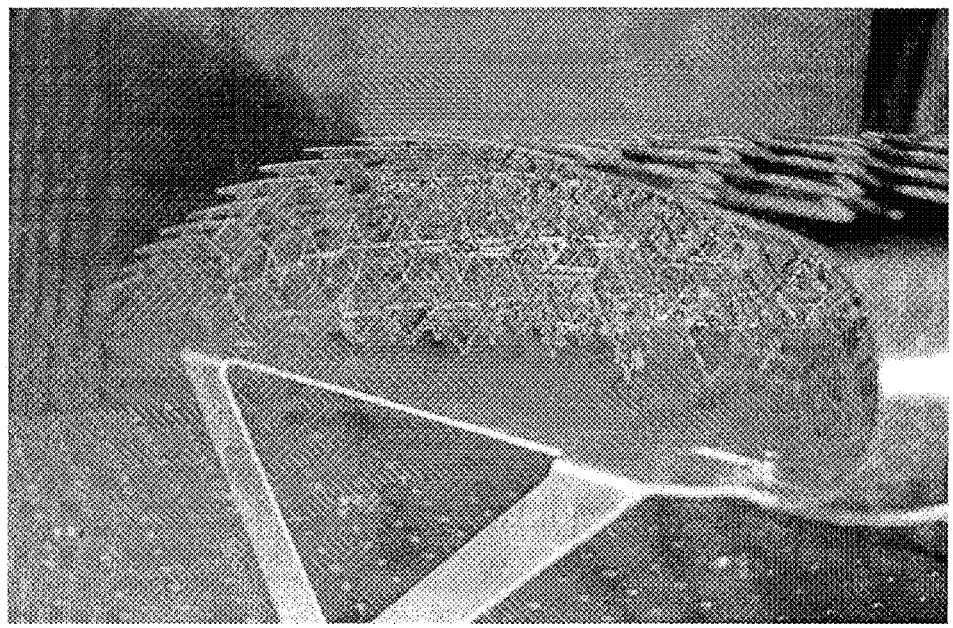
FIG. 46 depicts a prototype digital cellular airfoil according to one aspect of the present invention.

The next phase of the wing wedge prototype is made of 12"×24" laminated sheets of carbon fiber composites. Earlier test pieces of the laminated sheets used a 500 W laser cutter, along with several experiments on a shopbot and a waterjet. The shopbot shows the most potential, when used with a $\frac{1}{32}$" diamond carbide end mill. Although the shopbot creates the best cuts, it also required a lot of time to change endmills, especially since the endmills are prone to break after two or less pieces are milled. The laser cutter was eventually the machine selected because of rapid part production. Over a 1000 pieces of the digital material shapes were lasercut in 6 days and assembled by hand in 4 days. FIG. 46 depicts a prototype digital cellular airfoil according to this method.

Figure 47:
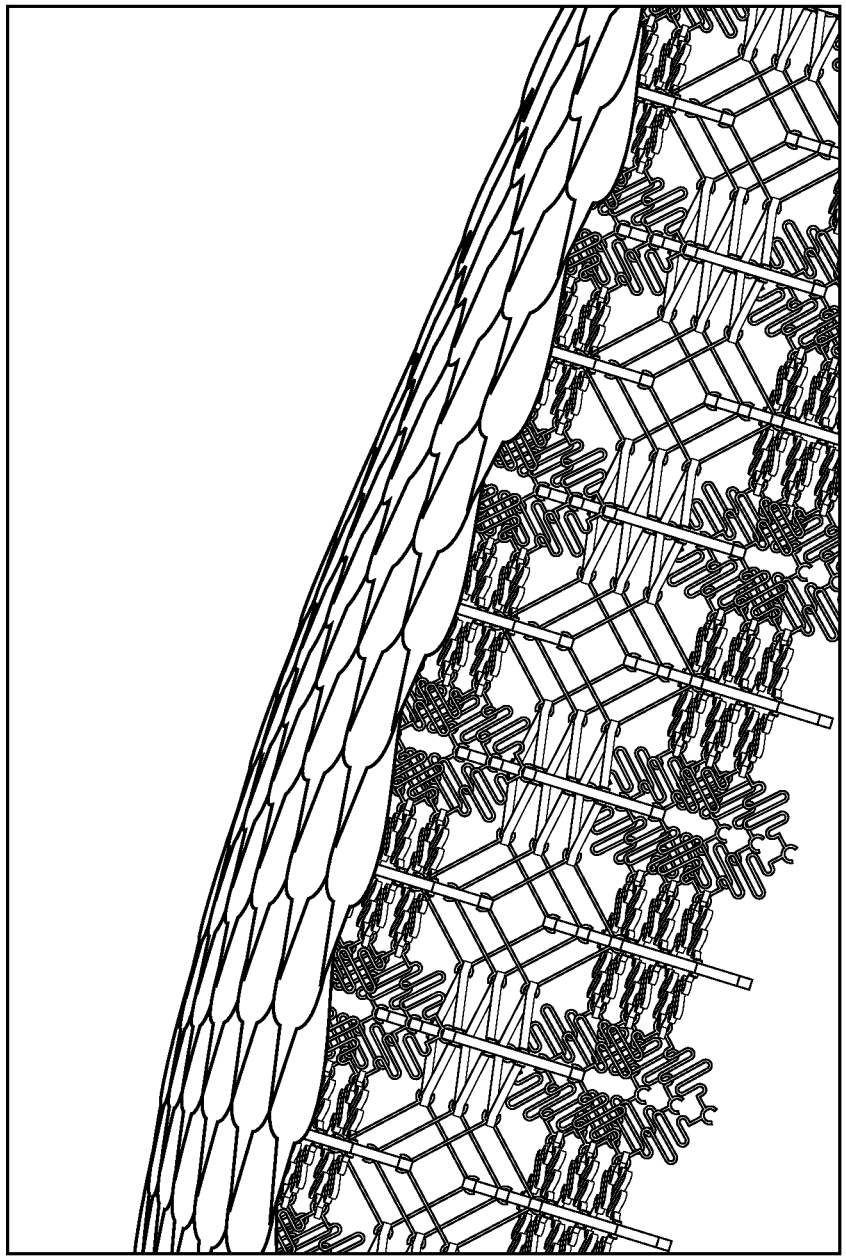
FIG. 47 depicts the interface between structure and airstream provided by cellular skin for the prototype digital cellular airfoil of FIG. 26.

The skin is discretized just like the structure, as scales or feathers, and is free to conform to the changeable shape of the structure. Each skin cell is only required to carry the aerodynamic loads of a parcel of the surface, according to the pitch of the supporting digital composite. In this example, there is some minor structural coupling between skin cells, which allows for smoothing of the surface. FIG. 47 depicts the interface between structure and airstream provided by cellular skin for a prototype digital cellular airfoil according to this method.

Figure 48:
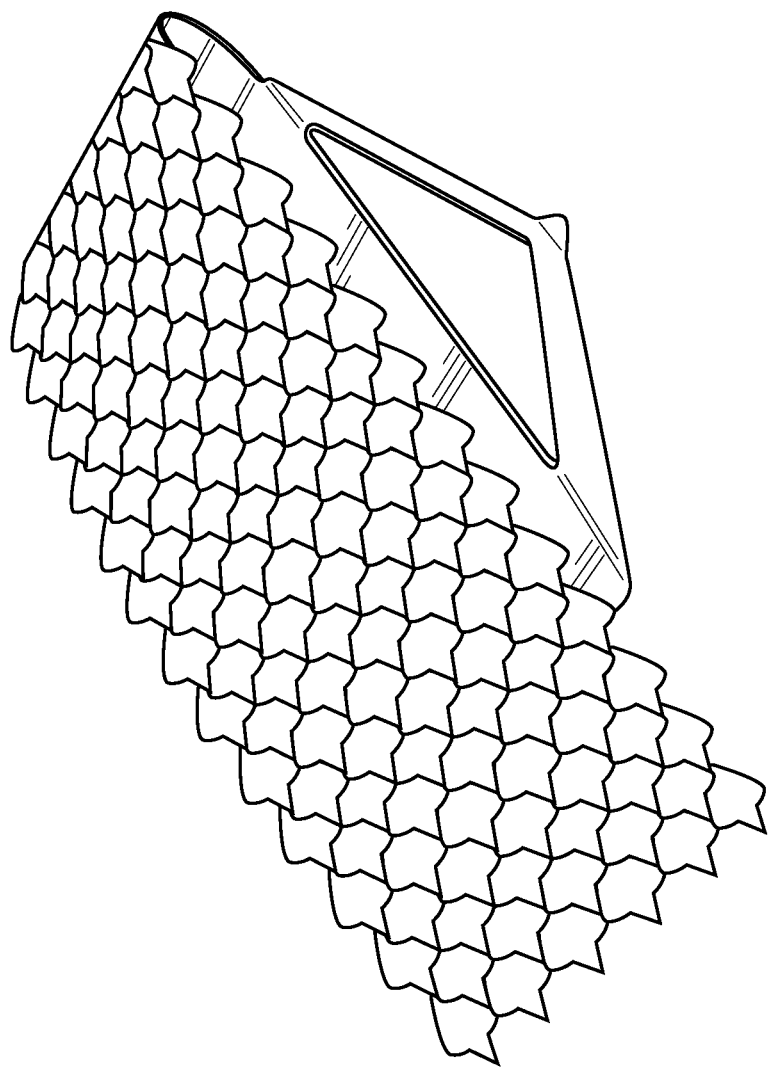
FIG. 48 is a top view of the prototype digital cellular airfoil with a digital material skin of FIGS. 46 and 47.
Figure 49:
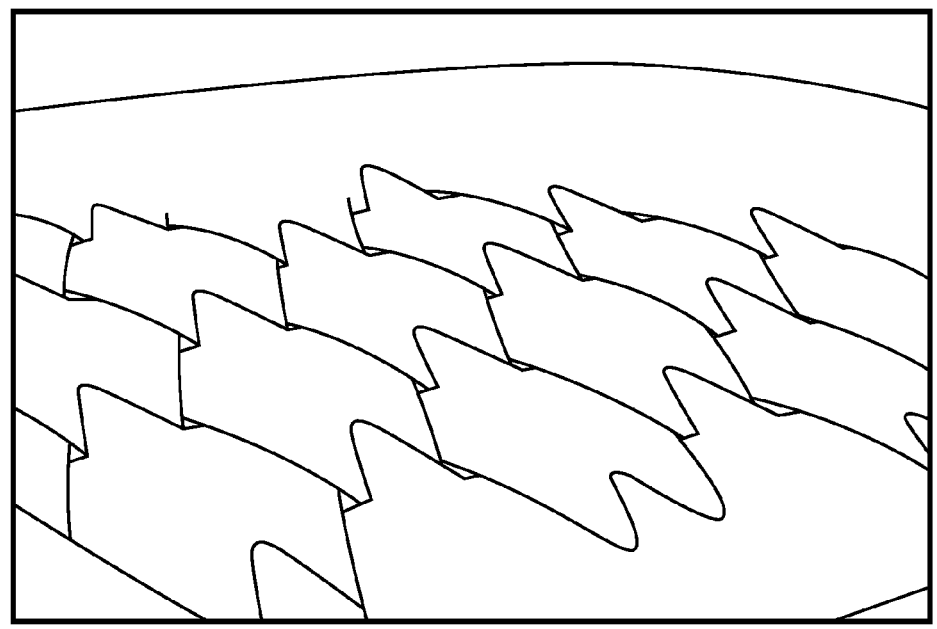
FIG. 49 is a magnified top view of the prototype digital cellular airfoil of FIG. 48.

The skin cells are tessellated overlapping units, each with a single attachment to the digital composite structure underneath. Since overall shape is controlled by the structure underneath, this skin handles negligible hoop stress, and primarily serves to transmit normal stress—so, it allows for free deformation of the surface within the plane of the surface. There are some details that need to be worked out, in order to make it able to maintain a proper pressure gradient for a given aerodynamic regime, and reduce tile-tile friction, but it performed well in the wind tunnel (lift characteristics showed that it worked as an airfoil; could maintain boundary layer attachment at high speed and angles of attack). FIG. 48 is a top view of a prototype digital cellular airfoil with a digital material skin according to this method. FIG. 49 is a magnified top view of the prototype digital cellular airfoil of FIG. 48.

Figure 50:
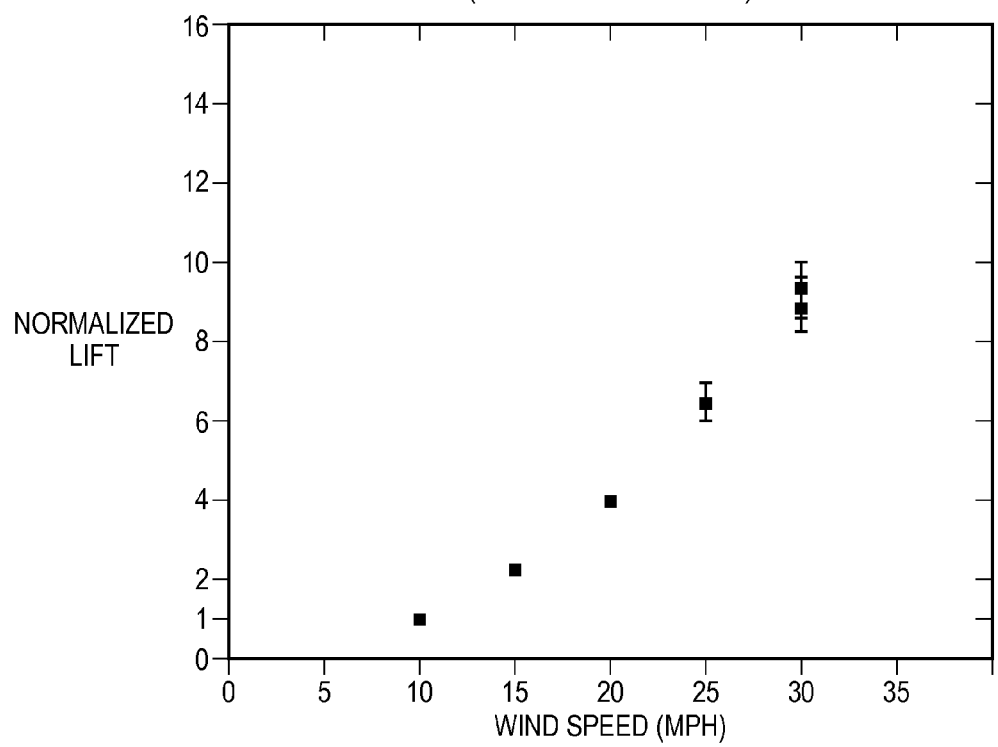
FIG. 50 is is a graph of normalized lift vs. wind speed for the prototype digital cellular airfoil of FIGS. 46-49.

The underlying structure has a two inch cell pitch, and the skin cells are produced from material that is 0.01" thick, constrained to a shape that is curved about the stream-wise axis with a 0.04" variation from the highest to lowest point, relative to the smooth convex hull of the underlying structure. Boundary layer attachment was sustained to twelve degrees angle of attack at thirty five miles per hour. This was the highest angle of attack and highest speed that we tested to. The next step for us is to produce a proper wing with this method. FIG. 50 is a graph of normalized lift vs. wind speed for a prototype digital cellular airfoil according to this method.

The experimental work has demonstrated that traditionally continuous pressure vessel materials discarded at the end of the tank lifecycle can be constructed out of a new material with a new design methodology that allows for reuse and recyclability. The work contributions include: a) new design workflow for tank skins and many other space applications, b) two high level strategies for digital material skin applications, one for a self-supporting skin such as balloons, thin walled tanks and another for a supported skin analogous to a foam core sandwich used in aircraft skin structures, c) origami tessellations as the approach to create overlapping digital material skins geometries for airtight and waterproof skins, d) a composite digital material skin made of multiple layers incorporating a rigid and flexible system both functioning as a skin and joining method to transfer loads within the structure, e) joints based on two inserts that interlock using a press-fit connection, penetrating one or more layers, f) the first structural skin application with components that are reversible, reusable and recyclable, and g) the first skin design to be part of a future material library of digital material skins. The larger goal includes developing a useful material fabrication method that may be used by all industries, and also for the average person interested in designing their own functional kit of skins. Not only will digital material skins expand our current applications and material selections, but it will greatly enhance our understanding of future waste retrieval of everyday commodities and have a great impact on our future environment.

Digital material skins according to the present invention are envisioned as being the future materials for reusable, recyclable, and reversible structural skins. Many relevant applications of digital material skins according to the invention are seen in the following industries: aerospace, such as, but not limited to, aircraft wing skins, boilers, and pressure vessels, storage and processing of liquid in water tanks, space and spacecraft fuel tanks, high pressure tanks for power storage, manufacturing, such as everyday household items, transportation, such as automobile structural frames and skins, building and construction, such as building facades, and countless other industries and applications relying on creating three-dimensional objects as distinct enclosures.

While a preferred embodiment is disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. An apparatus having a digital material skin, comprising:
   an internal volume or structure; and
   a digital material skin overlaying the internal volume or structure, the digital material skin comprising:
      a set of reversibly connectable discrete units, the set of discrete units being assembled into a substantially flat layer according to a regular geometry, each of the discrete units being connected to at least one other unit in the set, wherein the connected set of units forms a substantially continuous interlocking or layered exterior structure surface that is larger than the individual discrete units.

2. The apparatus of claim 1, wherein the apparatus is a pressure vessel.

3. The apparatus of claim 1, wherein at least some of the discrete units in the digital material skin are stacked when arranged according to the regular geometry.

4. The apparatus of claim 1, wherein the digital material skin is self-supporting.

5. The apparatus of claim 1, wherein the digital material skin is supported by an interior digital structure.

6. The apparatus of claim 1, wherein the digital material skin fully encloses an interior volume.

7. The apparatus of claim 1, wherein the units in the set of discrete units are identical.

8. The apparatus of claim 1, wherein the units in the set of discrete units are of at least two types, wherein each type of unit has a different shape or material composition.

\* \* \* \* \*